(12) United States Patent
Engels et al.

(10) Patent No.: US 8,515,059 B2
(45) Date of Patent: Aug. 20, 2013

(54) CRYPTOGRAPHIC PROCESSOR WITH DYNAMIC UPDATE OF ENCRYPTION STATE

(76) Inventors: Daniel W. Engels, Colleyville, TX (US); Kenneth Alan Lauffenburger, Plano, TX (US); Eric Myron Smith, Dallas, TX (US); Troy Hicks, Allen, TX (US)

( * ) Notice: Subject to any disclaimer, the term of this patent is extended or adjusted under 35 U.S.C. 154(b) by 0 days.

(21) Appl. No.: 13/076,357

(22) Filed: Mar. 30, 2011

(65) Prior Publication Data
US 2012/0087488 A1    Apr. 12, 2012

Related U.S. Application Data

(60) Provisional application No. 61/282,769, filed on Mar. 30, 2010.

(51) Int. Cl.
*H04L 9/28* (2006.01)
(52) U.S. Cl.
USPC ............................................. 380/28; 380/265
(58) Field of Classification Search
USPC .................................................. 380/28, 265
See application file for complete search history.

(56) References Cited

U.S. PATENT DOCUMENTS

| | | | |
|---|---|---|---|
| 7,305,567 B1 * | 12/2007 | Hussain et al. | 713/189 |
| 7,519,833 B2 * | 4/2009 | Henry et al. | 713/190 |
| 7,715,553 B2 * | 5/2010 | Smith et al. | 380/29 |
| 8,060,755 B2 * | 11/2011 | Henry et al. | 713/190 |
| 8,155,306 B2 * | 4/2012 | Brickell et al. | 380/28 |
| 2005/0213752 A1 * | 9/2005 | Hawkes et al. | 380/28 |

\* cited by examiner

*Primary Examiner* — Matthew Smithers

(57) ABSTRACT

An efficient implementation of a cryptographic processor that dynamically updates the encryption state is described. The cryptographic processor can be implemented with a minimal number of gates, yet still perform cryptographic operations quickly. The cryptographic processor has an interface, a memory, a pseudorandom permutation block and control logic. The interface receives input data blocks and returns cryptographically processed data blocks. The memory is used to store an encryption state of the cryptographic processor. The pseudorandom permutation block transforms a portion of the encryption state that is modified for each input data block by at least the input data block and a previously transformed data block. The control logic routes data in the cryptographic processor to return cryptographically processed data blocks at the interface and update dynamically the encryption state stored in memory using the transformed data blocks from the pseudorandom permutation block.

23 Claims, 28 Drawing Sheets

Hummingbird Cipher Algorithmic Description

| Encryption Process | Decryption Process |
|---|---|
| $V12_t = E_{K1}(PT_i \boxplus RS1_t)$ | $V34_t = D_{K4}(CT_i) \boxminus RS4_t$ |
| $V23_t = E_{K2}(V12_t \boxplus RS2_t)$ | $V23_t = D_{K3}(V34_t) \boxminus RS3_t$ |
| $V34_t = E_{K3}(V23_t \boxplus RS3_t)$ | $V12_t = D_{K2}(V23_t) \boxminus RS2_t$ |
| $CT_i = E_{K4}(V34_t \boxplus RS4_t)$ | $PT_i = D_{K1}(V12_t) \boxminus RS1_t$ |

Internal State Updating Process $$LFSR_{t+1} \leftarrow LFSR_t$$

$$RS1_{t+1} = RS1_t \boxplus V34_t$$

$$RS2_{t+1} = RS2_t \boxplus V12_t \boxplus RS4_t$$

$$RS3_{t+1} = RS3_t \boxplus V23_t \boxplus LFSR_{t+1}$$

$$RS4_{t+1} = RS4_t \boxplus V12_t \boxplus RS1_{t+1}$$

FIG. 2

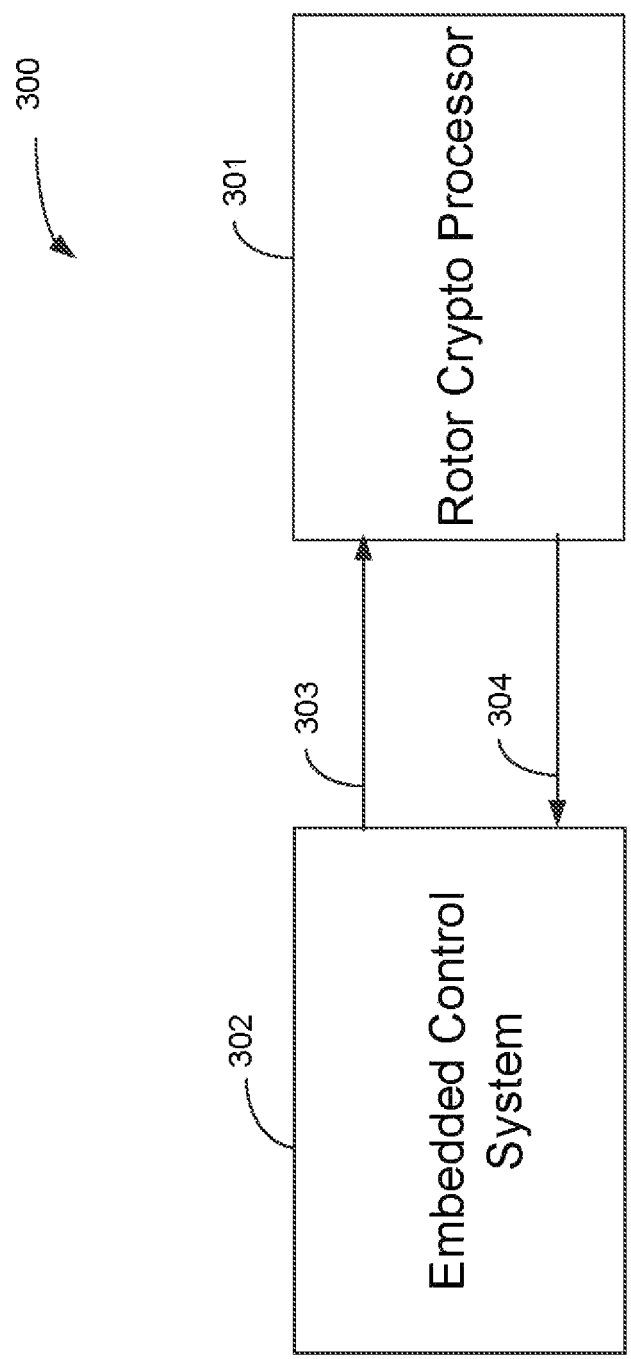

Hummingbird-2 Cipher Algorithmic Description

| Encryption Process | Decryption Process |
|---|---|
| $V12_t = E_{K1}(PT_t \boxplus RS1_t)$ | $V34_t = D_{K4}(CT_t \boxminus RS1_t) \boxminus RS4_t$ |
| $V23_t = E_{K2}(V12_t \boxplus RS2_t)$ | $V23_t = D_{K3}(V34_t) \boxminus RS3_t$ |
| $V34_t = E_{K3}(V23_t \boxplus RS3_t)$ | $V12_t = D_{K2}(V23_t) \boxminus RS2_t$ |
| $CT_t = E_{K4}(V34_t \boxplus RS4_t) \boxplus RS1_t$ | $PT_t = D_{K1}(V12_t) \boxminus RS1_t$ |

Internal State Updating Process $RS1_{t+1} = RS1_t \boxplus V34_t$ $RS2_{t+1} = RS2_t \boxplus V12_t$ $RS3_{t+1} = RS3_t \boxplus V23_t$ $RS4_{t+1} = RS4_t \boxplus V12_t \boxplus RS1_{t+1}$ $ACC1_{t+1} = ACC1_t \oplus RS1_{t+1}$ $ACC2_{t+1} = ACC2_t \oplus RS2_{t+1}$ $ACC3_{t+1} = ACC3_t \oplus RS3_{t+1}$ $ACC4_{t+1} = ACC4_t \oplus RS4_{t+1}$

FIG. 12

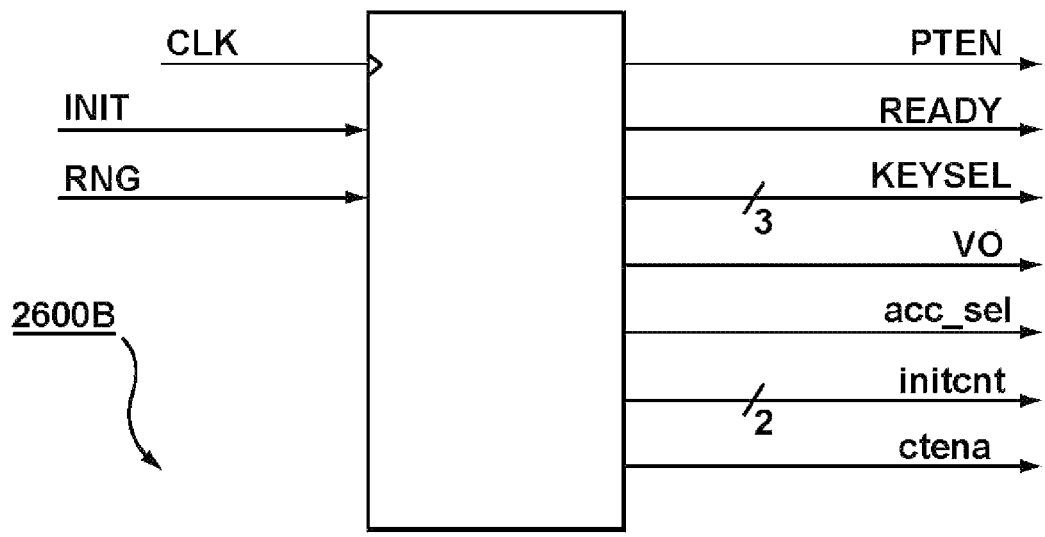
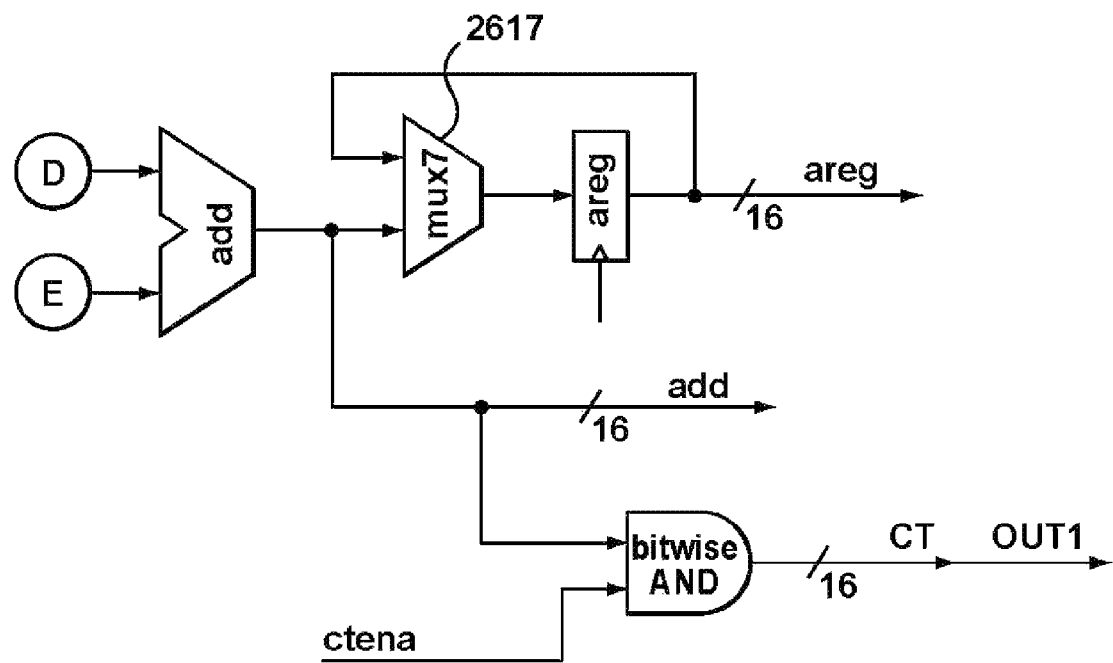
FIG. 14C

CRYPTOGRAPHIC PROCESSOR WITH DYNAMIC UPDATE OF ENCRYPTION STATE

RELATED APPLICATIONS

This application claims the benefit of U.S. Provisional Application Ser. No. 61/282,769 filed on Mar. 30, 2010 and entitled "Cryptographic Processor with Dynamic Update of Encryption State", the entire contents of which are hereby incorporated by reference herein for all purposes.

FIELD

The described embodiments relate generally to cryptographic processors. Specifically, some embodiments relate to rotor-based cryptographic processors implemented in an efficient manner, particularly with respect to gate count and power usage.

INTRODUCTION

In cryptography, encryption is the process of transforming plaintext using an algorithm to ciphertext that is generally unreadable to anyone except those possessing special knowledge, usually referred to as the key. The reverse process, transforming the ciphertext back to the original plaintext, is referred to as decryption.

Mathematically, encryption and decryption are inverse transformations of one another. When the key that is used for both encryption and decryption is identical, or trivially related, the key is said to be a symmetric key. In general, symmetric key encryption algorithms tend to be less computationally intensive, and therefore faster, than asymmetric key algorithms that use different keys for encryption and decryption.

Generally, a cryptographic device or system may be used to perform the encryption and decryption operations at the transmitting and receiving ends of a communication channel.

A rotor-based cryptographic algorithm is, in general, a symmetric secret key cipher that may be used to provide security from unsanctioned or illicit interception and modification of communications. In the 1920s, mechanical encryption devices called rotor machines were developed to automate the process of encryption. The rotor machines used several rotors and gears that moved each rotor at a different rate. Each rotor performed a simple substitution cipher and the rotors were connected so that a subsequent rotor performed another substitution using the result from the previous rotor, with the final rotor outputting the ciphertext. After encrypting, the rotors would shift so that the resulting substitutions would be different for the next encryption process.

The position of the rotors prior to encryption represented the state of the encryption device and formed part of the special knowledge that was required to successfully decrypt the ciphertext.

SUMMARY

In a first aspect, some embodiments provide a cryptographic processor comprising an interface, a memory, a pseudorandom permutation block and control logic. The interface receives input data blocks and returns cryptographically processed data blocks. The memory is used to store an encryption state of the cryptographic processor and possibly one or more keys. The pseudorandom permutation block transforms a portion of the encryption state, which is modified for each input data block by at least the input data block and a previously transformed data block. The control logic routes data in the cryptographic processor to return cryptographically processed data blocks at the interface and update dynamically the encryption state stored in memory using the transformed data blocks from the pseudorandom permutation block.

In some embodiments the encryption state is stored in rotor state registers that, in still other embodiments, are pipelined and updated sequentially under direction of the control logic.

The encryption state may further be comprised of a deterministic data generator that in some embodiments may be implemented as a linear feedback shift register or a counter. The encryption state may further be comprised of a set of accumulator registers.

In some embodiments, pseudorandom permutation block implements a block cipher. The block cipher can perform any number of substitution-permutation rounds where some embodiments may use S-boxes for the substitution round.

In other embodiments, a key is mixed with the input to the pseudorandom permutation block. In still other embodiments the permutation rounds may transpose bits from the substitution rounds. In other embodiments the permutation rounds perform an XOR function on the data from the substitution rounds with one or more bit-shifted versions of the data from the substitution rounds. In still other embodiments, the pseudorandom permutation block comprises an output buffer for storing the output from at least one of the substitution-permutation rounds.

Additional features and aspects are described in the following description of several exemplary embodiments.

BRIEF DESCRIPTION OF THE DRAWINGS

A number of exemplary embodiments will now be described in detail with reference to the drawings, in which:

FIG. 2 shows equations that define the encryption and decryption of a data block for the Hummingbird process shown in FIG. 1;

FIG. 3A a high-level block diagram of a system for providing either encryption or decryption, or a combination of both;

FIG. 12 shows equations that define the encryption and decryption of a data block for the Hummingbird-2 process shown in FIG. 11;

FIGS. 14A to 14D are schematic illustrations of an embodiment of a rotor crypto processor datapath using accumulators for implementing an encryption operation in a 20 cycle datapath

DESCRIPTION OF SOME EXEMPLARY EMBODIMENTS

Figure 1:
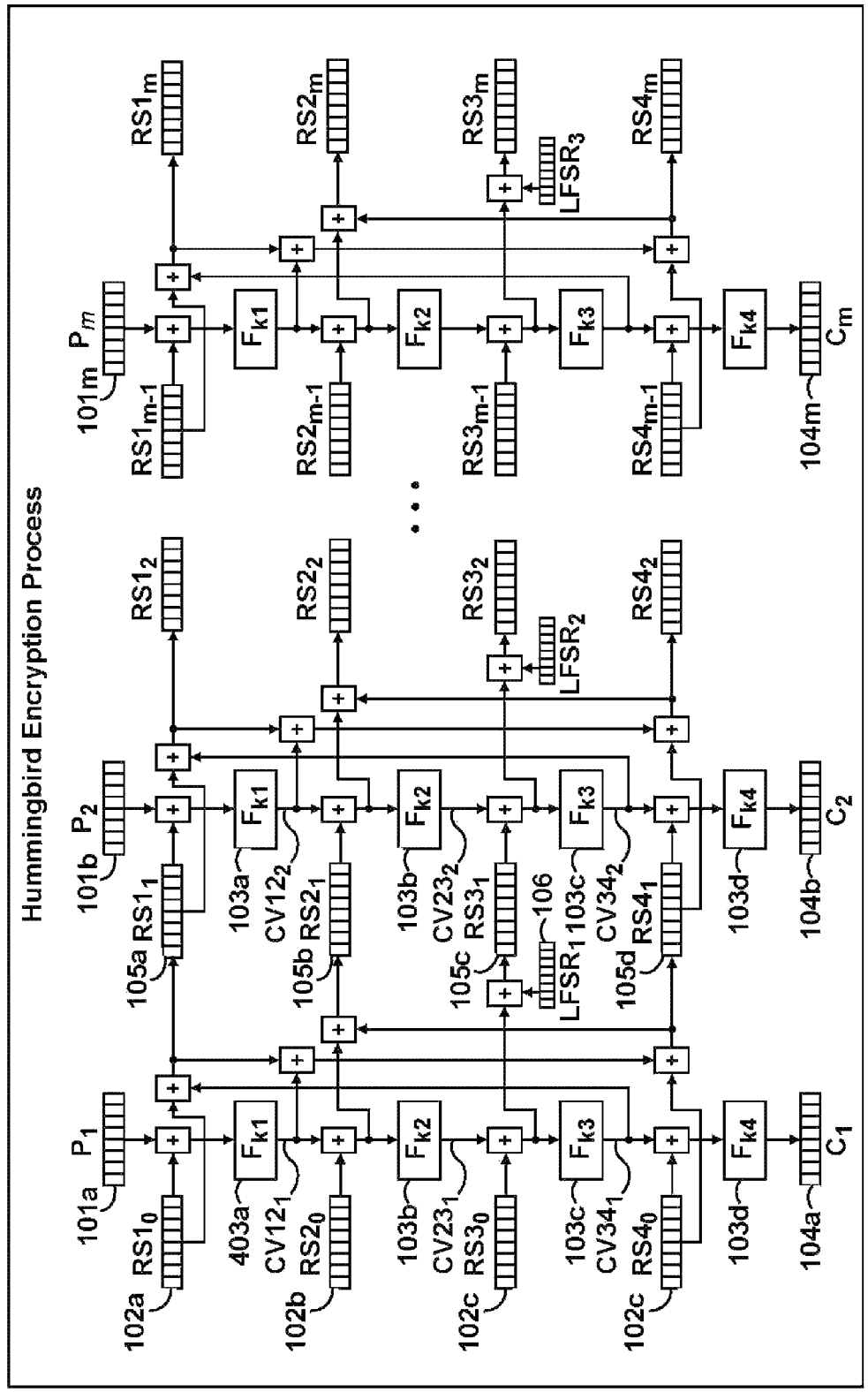
FIG. 1 is a schematic diagram showing an implementation of the Hummingbird encryption process.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments as described.

In some cases, the embodiments of the systems and methods described herein may be implemented in hardware, or software, or a combination of both hardware and software. In some cases, embodiments may be implemented in computer programs executing on programmable computing device each comprising at least one processor, a data storage device (including in some cases volatile and non-volatile memory and/or data storage elements), and optionally at least one input device, and at least one output device.

In some cases, embodiments may be implemented in an application specific integrated circuit (ASIC), a Field Programmable Gate Array (FPGA) device, other devices which may include general reconfigurable hardware devices In some cases, programs may be implemented in a high level procedural or object oriented programming and/or scripting language to communicate with a computer system. However, programs can be implemented in assembly or machine language, if desired. In any case, the language may include compiled or interpreted language.

In some embodiments, the systems and methods as described herein may also be implemented as a non-transitory computer-readable storage medium, configured with a computer program, wherein the storage medium so configured causes a computer to operate in a specific and predefined manner to perform at least some of the functions described herein.

In digital cryptography, the most commonly used symmetric key ciphers are stream ciphers and block ciphers. In a stream cipher algorithm, the plaintext bits are combined with a pseudorandom cipher bit stream produced by a keystream generator. The encryption of each bit of plaintext is dependent on the current state of the keystream generator.

A block cipher on the other hand operates on blocks of fixed bit width, but unlike stream ciphers, encrypting the same plaintext using the same key always produces the same ciphertext. Cipher-block chaining is a mode of operation of a block cipher that applies the previously calculated ciphertext block to the plaintext prior to encryption. In cipher-block chaining each ciphertext is dependent on all previously processed plaintext blocks and the initialization vector applied to the first block.

While stream ciphers may be fast and hardware efficient they are susceptible to key reuse attacks if the keystream generator has the same state twice the same key is used twice with the same initialization vector) or substitution attacks. Certain modes of operation of block ciphers may be more secure but use larger and less efficient hardware to implement the substitution network.

Rotor-based ciphers are neither block ciphers nor stream ciphers. A rotor-based cryptographic algorithm operates on a block of n bits of data at a time. A basic electronic implementation of a rotor based encryption system uses tables to represent the substitutions that would be performed by each of the physical rotors in the mechanical implementation.

The use of the tables normally consumes large amounts of digital memory to store each rotor. Non-volatile memory, such as a hard drive, FLASH or EEPROM must be used to store the table values if they are to be reused, and specific volatile memory such as RAM may be used to store the table values during system operation to improve performance.

High memory requirements, both non-volatile and volatile memory, to store rotor values leads to a high gate count (i.e., large circuitry requirements), high power usage and potentially slow operation, particularly in field programmable gate arrays (FPGA) and silicon (custom) implementations.

Low power devices such as radio frequency identification (RFID) tags, sensor devices, ad hoc wireless network devices, mobile communication devices, and other mobile devices that require low power encryption operations find such large, power inefficient implementations infeasible for their normal operation and usage requirements. In particular, these low power mobile devices typically operate with micro-Watts of power or less (as is the case with passive UHF RFID tags), or with very limited power, such as battery operated semi-passive and active RFID tags and other wireless sensor devices.

An example of a rotor-based cipher that is based on a pseudorandom permutation and a rotor-stepping rule rather than using rotor tables is the Hummingbird cryptographic algorithm from Revere Security. The rotor-stepping rule allows the rotor settings to be updated dynamically and the pseudorandom permutation replaces the large tables. The Hummingbird algorithm was presented in patent application Se. No. 11/496,214, now U.S. Pat. No. 7,715,553 to Smith et al., entitled "ENCRYPTING A PLAINTEXT MESSAGE WITH AUTHENTICATION", hereby incorporated by reference herein in its entirety.

Referring for example to FIG. 1, shown therein is a schematic of an implementation of the Hummingbird encryption process that uses four rotor state registers 102a-d to transform plaintext blocks 101a-m into ciphertext blocks 104a-m.

The four pseudorandom permutation blocks 103a-d each use a different key. FIG. 2 shows the equations that define the encryption and decryption of a data block for the Hummingbird process shown in FIG. 1.

Figure 11:
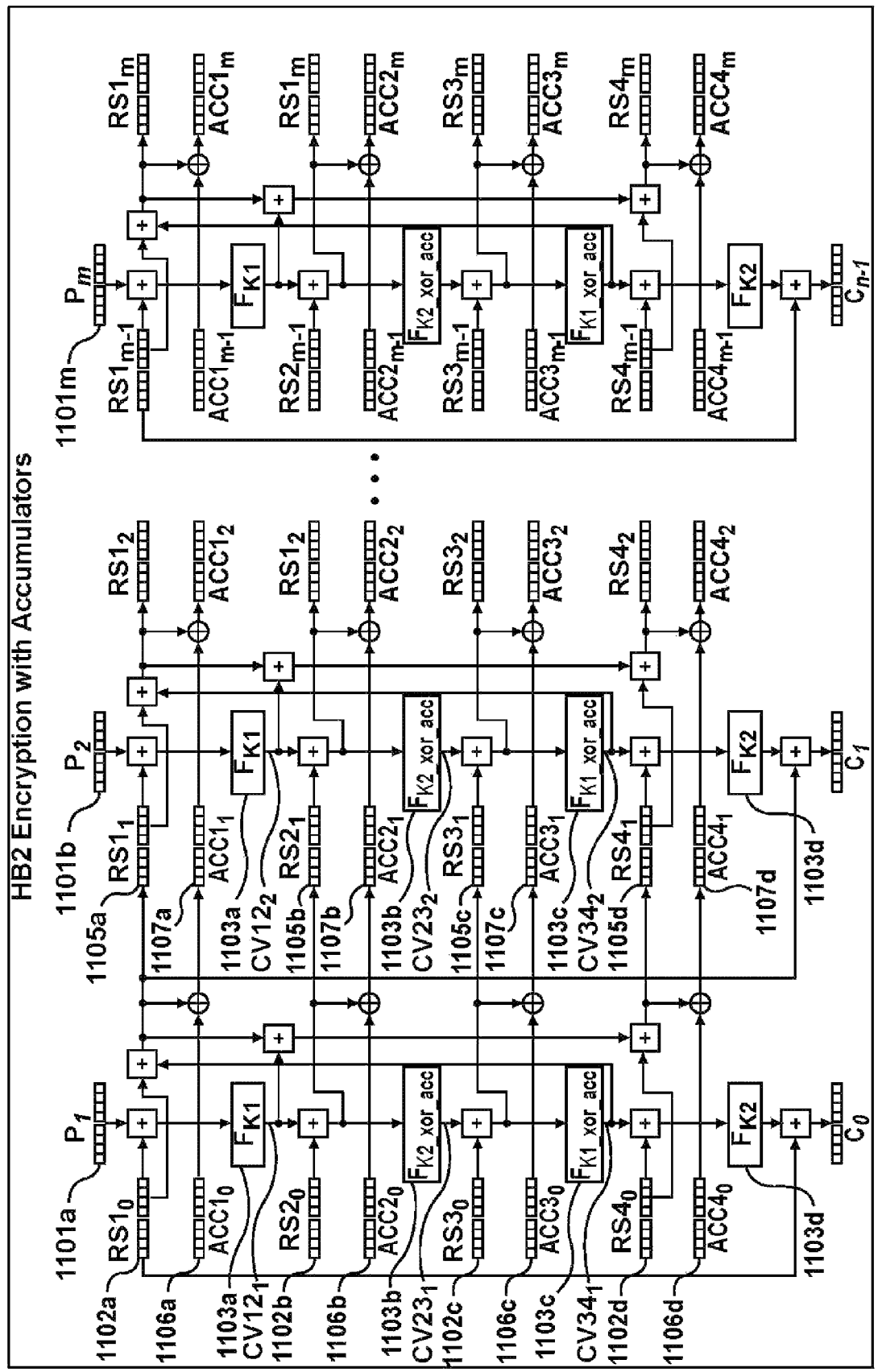
FIG. 11 is a schematic diagram showing an implementation of the Hummingbird-2 encryption process.

An alternate Hummingbird encryption process is shown in FIG. 11. This alternate process, referred to as Hummingbird-2, uses four rotor state registers 1102a-d to transform plaintext blocks 1101a-m to ciphertext blocks 1104a-m plus four accumulator registers 1107a-d that accumulate the state changes in the rotors. The accumulator registers 1107a-d may then be used to influence the key in one or more of the rotors. In this case the key in functional block FK2 1103b and FK3 1103c are influenced by the accumulator registers 1107a-d.

The four pseudorandom permutation blocks 1103a-d each use a different key and are influenced by the accumulator registers. FIG. 12 shows the equations that define the encryption and decryption of a data block for the Hummingbird-2 process shown in FIG. 11.

In some embodiments, the key length for the Hummingbird-2 process may be 128 bits. In some embodiments, the key length for the Hummingbird-2 process may be 256 bits.

Rotor-based ciphers that dynamically update rotor settings may be implemented in software on low power microcontrollers, as shown in Fan et al., "Lightweight Implementation of Hummingbird Cryptographic Algorithm on 4-Bit Microcontrollers," International Workshop on RFID Security and Cryptography 2009 (RISC09), Nov. 10, 2009, London, UK.

Although microcontrollers may be designed for small or dedicated applications, the architecture of the microcontroller can include a number circuits, such as those related to I/O ports, memory, or interrupt handling, that increase the gate count and power usage, thus making this approach generally unsuitable for most low power devices.

For example, one hardware implementation of the Hummingbird encryption dataflow shown in FIG. 1 would require a minimum of 9 adders; 4 functional blocks ($F_{K1}$, $F_{K2}$, $F_{K3}$, and $F_{K4}$) to implement the rotor stepping and mixing with the data flow; a LFSR (linear feedback shift register); and at least 6 registers. This implementation would take one clock cycle per data block being encrypted. The data path is very long in this implementation, limiting the clock rate of the circuit, and thus how fast the circuit could encrypt and decrypt. The hardware and resulting power requirements are far in excess of what is available for feasible use within resource constrained devices, such as RFID tags and wireless sensor network nodes.

Similarly, one hardware implementation of the Hummingbird-2 encryption dataflow as shown in FIG. 11 would require a minimum of 8 adders; 4 functional blocks ($F_{K1}$, $F_{K2}$, $F_{K3}$, and $F_{K4}$) to implement the rotor stepping and mixing with the data flow; 4 16-bit XOR (exclusive OR) functional blocks; and at least 10 registers. This implementation would take once clock cycle per data block being encrypted. The data path is also very long in this implementation, limiting the clock rate of the circuit, and thus how fast the circuit could encrypt and decrypt. The hardware and resulting power requirements are also generally far in excess of what is available for feasible use within resource constrained devices, such as RFID tags and wireless sensor network nodes.

It is desirable to provide a small, fast, power efficient cryptographic processor for use within low power, resource constrained devices. The cryptographic algorithm should be implemented in a minimal number (or at least a reduced number) of logic gates so that it tends to be less implementation area intensive and power intensive than other hardware implementations. The cryptographic algorithm should also be implemented to complete cryptographic operations in a minimal amount of time.

In order to implement efficient cryptographic processors that minimize power and gate count while retaining speed, the components in the datapath should be minimized (or at least reduced) while allowing the cipher operations to be completed in the fewest possible clock cycles.

Reference is first made to FIG. 3A, which shows a high-level block diagram of a system 300 for providing either encryption or decryption, or a combination of both encryption and decryption. System 300 includes a rotor crypto processor 301 and an embedded control system 302. The rotor crypto processor (RCP) 301 provides an encryption/decryption algorithm that is dependent on the internal state of the RCP 301.

Rotor crypto processor 301 includes encryption state registers that define the internal state of the rotor crypto processor 301. While the rotor crypto processor 301 as shown can both encrypt and decrypt, some embodiments may include two rotor crypto processors: one dedicated to encryption and one dedicated to decryption.

While the embodiments described herein relate to rotor-based encryption algorithms, and more specifically to implementation of the Hummingbird rotor-based algorithm and its variants, other embodiments may employ other register schemes for storing an encryption state. Also, other variations may include storing the encryption state in some form of computer memory, for example volatile or non-volatile, which may include various RAM implementations, hardware registers, flash memory or hard drives, and so on.

Other embodiments may also update the encryption state registers dynamically through a pseudorandom permutation that may depend on any one or more of the encryption state registers, the input data block, a pseudorandom number generator, and any previous or current state of the aforementioned.

Rotor crypto processor 301 may be implemented as a semiconductor intellectual property core containing logic circuits, modeled using a hardware descriptor language, or layout and placement design information. The rotor crypto processor 301 may be used in a logic simulation environment, or it may be implemented as an application specific integrated circuit (ASIC), field programmable gate array (FPGA), other programmable logic devices, or any other circuit implementation, in silicon or otherwise.

Embedded control system 302 communicates with the rotor crypto processor (RCP) 301 through a rotor crypto processor interface for receiving inputs 303 and returning rotor crypto processor outputs 304, in some cases, an embedded control system 302 may be implemented as a processor, such as a microcontroller, that provides other functionality, including communication functions for example, for a larger system.

In some embodiments, the system 300 may be implemented as a system-on-a-chip wherein the rotor crypto processor 301 is combined with other components, such as for example a microcontroller, power management logic and external interface logic for wired or wireless communications.

In some embodiments, the rotor crypto processor may be used in a system-on-a-chip RFID tag implementation that includes control logic, communication logic, memory elements, and radio frequency (RF) circuitry.

Figure 3B:
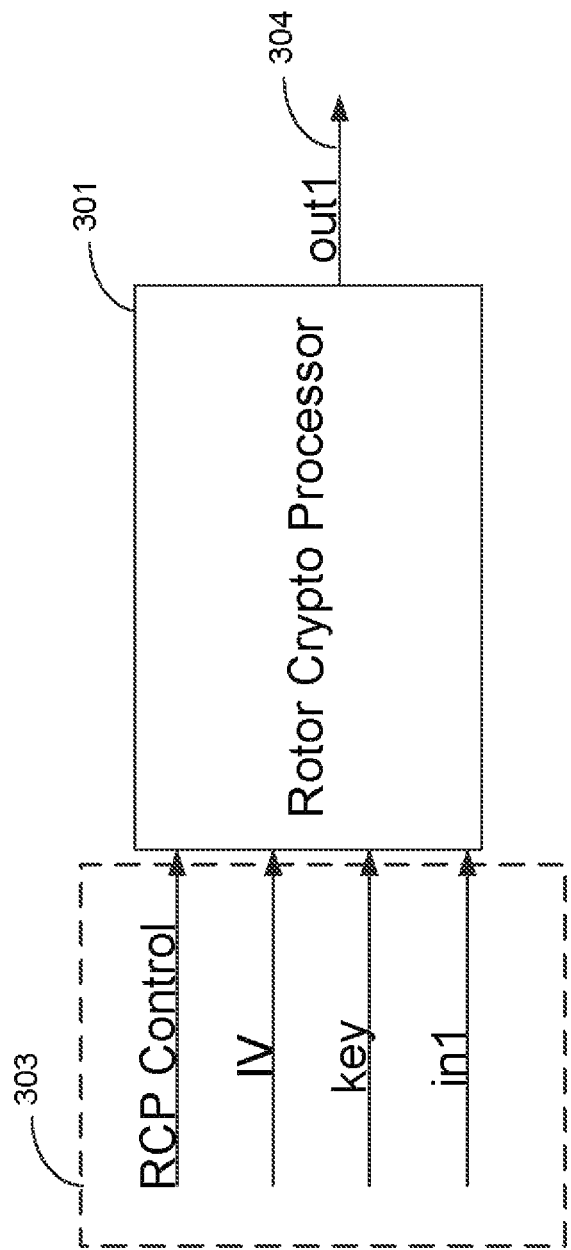
FIG. 3B is block diagram of a rotor crypto processor from FIG. 3A.

Reference is next made to FIG. 3B, which shows a more detailed view of inputs 303 and outputs 304. RCP inputs 303 include RCP control signals (RCP Control), an initialization vector (IV), the key used for the cryptographic functions (key), and an input (in1) that is either the plaintext for an encryption operation or the ciphertext for a decryption operation. RCP 301 will drive RCP outputs 304 (out1) with either the encrypted or decrypted data. Other inputs that are not shown may include a power input, a clock signal or chip enable, among others.

RCP control signals are used to control the operation of the RCP 301. RCP control signals may include signals to indicate that the data is valid on the input, that the RCP 301 should either encrypt or decrypt data on the input, or an initialization signal to indicate that the RCP 301 should initialize using data on the initialization vector input, RCP outputs may also include a signal indicating that the RCP 301 is initialized or ready, and a signal to indicate that the data output is valid.

Figure 4:
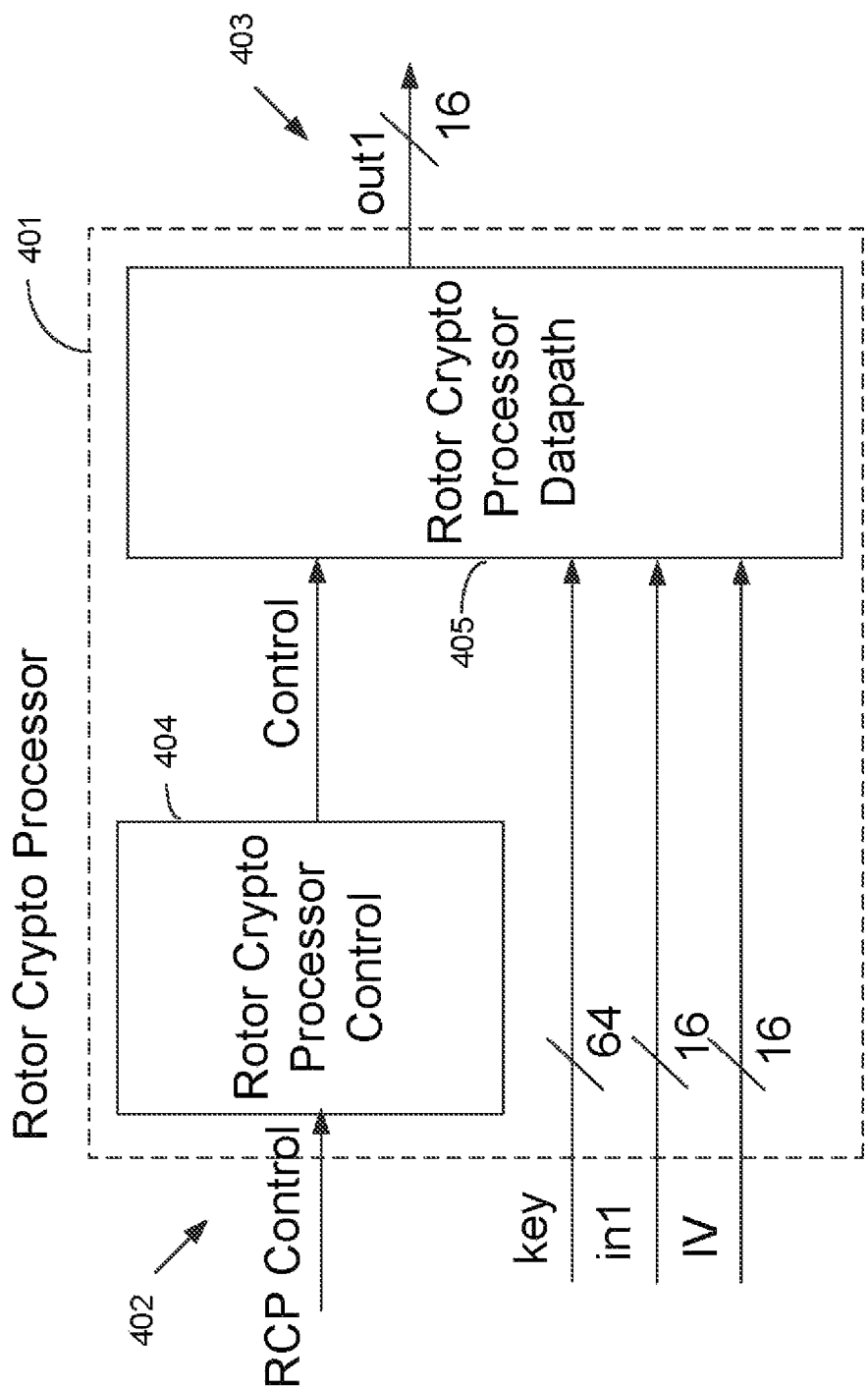
FIG. 4 is a block diagram of a 16-bit rotor crypto processor showing control and datapath blocks.

Referring now to FIG. 4, illustrated therein is a block diagram of a 16-bit rotor crypto processor (RCP) 401. RCP 401 accepts inputs 402 and produces outputs 403. In particular, as shown the RCP 401 accepts a 16-bit data block input of plaintext or ciphertext on the input labeled 'in1' and outputs a 16-bit block of either encrypted or decrypted data (depending on the mode of operation of the RCP 401) through output 403 labeled 'out1'.

RCP 401 has a rotor crypto processor controller, or control block, 404 and a rotor crypto processor datapath, or datapath block 405. Control block 404 outputs control signals to datapath block 405 to control the flow of data and its manipulation through datapath block 405.

Control signals from control block 404 may include multiplexer control signals and register enable control signals. Datapath block 405 contains the logic circuitry, registers and multiplexers to encrypt or decrypt the input data.

As shown, the width of the datapath 405 is 16-bits since it operates on blocks of data that are 16 bits wide. Other embodiments may use either a smaller or larger datapath width. In particular, alternative embodiments may use a different bit width for the input than the width of the datapath; however, an input buffer and control elements will normally be required in such cases to regulate the input according to the width of the datapath. Similarly, alternative embodiments may also use a different bit width for the output than the block size of the datapath and this will also require appropriate buffering and control.

RCP 401 uses a key that is external to the block and input to RCP 401 through the 64-bit key input labeled 'key'. Alternative embodiments may store the key in a memory element within the RCP, such as volatile memory element, a persistent memory array, a non-volatile memory element or some combination of the aforementioned memory elements.

The memory element may be loaded with a dedicated key input or through the input labeled 'in1' under the control of the rotor crypto processor controller. Alternative embodiments may allow for the storage of multiple keys in one or more memory elements within the RCP 401. The key to be used for a particular operation may be chosen with dedicated control signals or through the general 'RCP Control' signals.

The key itself may be larger than width of the key input and as such a number of clock cycles may be required to transmit the entire key to the RCP 401. For example, a 256-bit key would require 4 clock cycles using the 64-bit key input of RCP 401. Alternative embodiments may vary the number of key input bits (e.g. either larger or smaller) to operate correctly for the datapath implementation of the RCP 401.

In general, embodiments that encrypt in fewer clock cycles will tend to require a larger number of key bits input at once. For example, implementation of the Hummingbird encryption data flow shown in FIG. 1 uses a 256-bit key with each 64-bit block of the key being used with one of the pseudorandom permutation blocks 103*a-d*. In a single clock cycle hardware implementation of Hummingbird all 256 bits of the key would be required at once.

RCP 401 also uses an initialization vector that is external to the block and input to RCP 401 through the 16-bit input labeled 'IV'. The initialization vector is used to configure the encryption state registers, or rotor state registers, of RCP 401 to a unique state. The initialization vector may be a random number, an incrementing counter, or any value, preferably one that has not been used before in the context of a given key. In some embodiments, the RCP 401 could accept a 64-bit initialization vector over 4 clock cycles through the 16-bit 'IV' input. Similar to the bit width of the key input, other embodiments could vary the number of IV bits input per clock cycle.

In some embodiments, the initialization vector may also be stored and generated within the RCP 401. For example, an alternative embodiment may include a random number generator, preferably a cryptographically secure pseudorandom number generator, within the RCP 401. Alternatively, the RCP 401 may be used to create a random number by encrypting the internal state of the RCP 401, such as a sum of two internal rotor registers, a sufficient number of times to generate an initialization vector.

In some embodiments, an internally generated initialization vector may be communicated outside the RCP 401 either through a dedicated output or through the output labeled 'out1' under the control of the rotor crypto processor control 404.

In some embodiments, an alternate implementation of the RCP 401 would contain sufficient memory and control functionality to allow the RCP 401 to maintain the cryptographic state of multiple processes simultaneously. In such an implementation the RCP 401 would be able to context switch (i.e., save and restore the cryptographic engine state) between multiple process streams generally without the need to repeat any cryptographic operations.

Figure 5A:
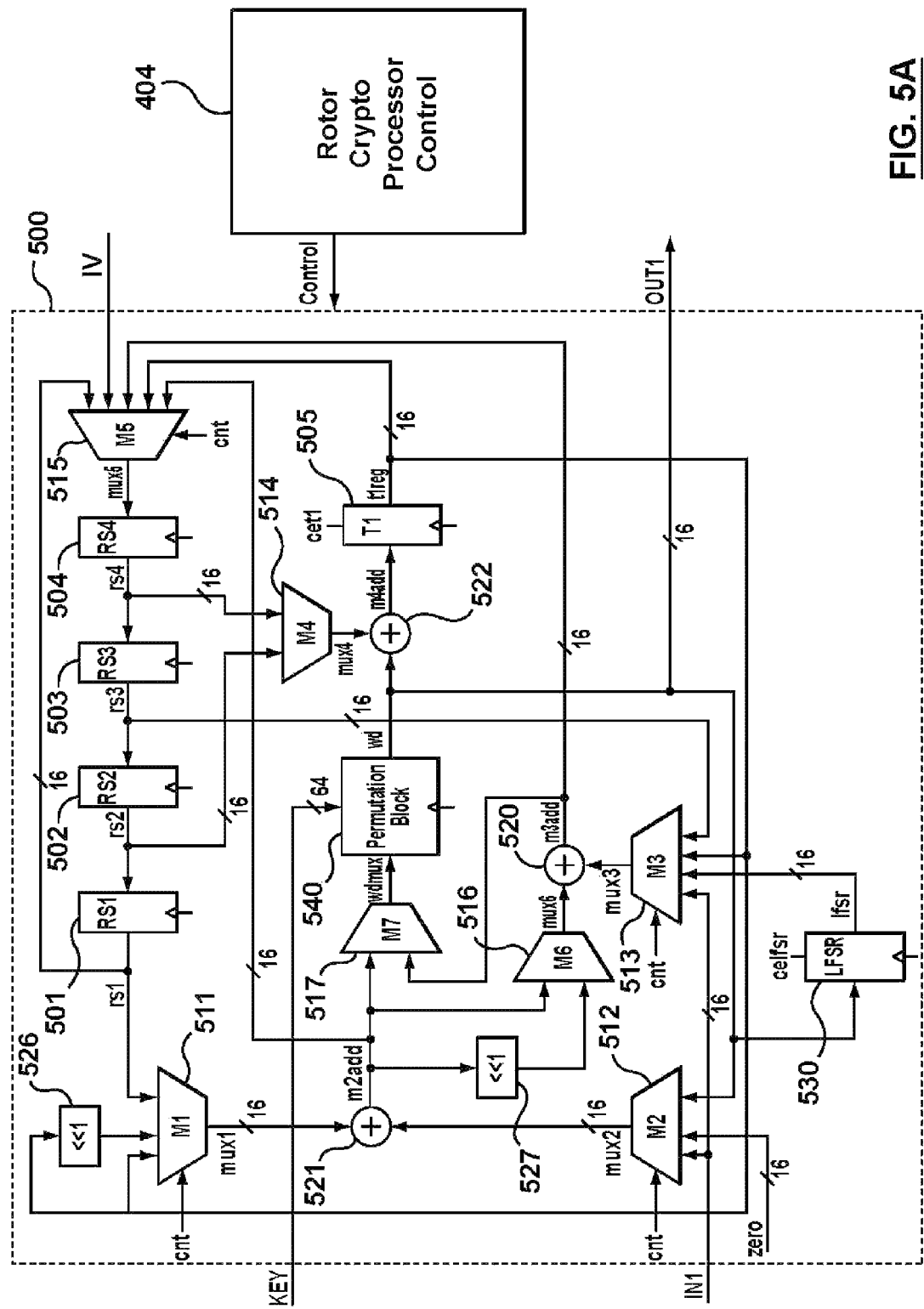
FIG. 5A is an embodiment of a rotor crypto processor datapath for implementing an encryption operation in four clock cycles.

Reference is now made to FIG. 5A, which shows an embodiment of a rotor crypto processor datapath 500. After initialization, the rotor crypto processor datapath 500 can encrypt a single data block in four clock cycles. The architecture of the RCP datapath 500 consists of four rotor state registers labeled RS1 501, RS2 502, RS3 503 and RS4 504; seven multiplexers labeled M1 through M7 511-517; three adders 520-522; a linear feedback shift register (LFSR) 530; an intermediate storage register 505; a permutation block 540; and two bit shifters 526-527.

Data flow through rotor crypto processor datapath 500 is controlled by control signals from rotor crypto processor control 404. Control signals may include signals to multiplexers M1 through M7 511-517 to select the appropriate output signal and register enable signals to control the update of registers RS1-RS4 501-504, intermediate storage register 532, and LFSR 530. The control signals are described in greater detail below with respect to the state machine implementation of the RCP control block 404.

Before RCP datapath 500 is ready to encrypt a data block, rotor state registers RS1-RS4 501-504 should be initialized. The rotor state registers may be either loaded with an external initialization vector or an internally generated initialization vector. The initialization vector is the initial value of rotor state registers RS1-RS4 501-504 and is part of the shared secret used to decrypt. This is similar to the initial rotor settings used on mechanical rotor encryption/decryption devices.

LFSR 530 may also need to be initialized prior to encryption as it also forms part of the shared secret used for decryption. The LFSR generates a deterministic bit stream that forms part of the encryption state and modifies rotor state registers when they are updated. In some embodiments, other deterministic generators, such as digital counters, may also be used.

As shown, rotor state registers RS1-RS4 501-504 are 16-bit registers connected in a pipeline manner and loaded from the output of multiplexer M5 515. Under control of RCP control 404, rotor state registers RS1-RS4 501-504 may be loaded sixteen bits at a time over four clock cycles. Other less gate-efficient embodiments may load rotor state registers in parallel in fewer clock cycles.

After loading the rotor settings, some embodiments may also include an initialization process to create a distance from the loaded initialization vector. For example, some embodiments may update the rotor state registers by encrypting one of the rotor state registers, or encrypting a sum of two or more of the rotor state registers. Some embodiments may also encrypt another shared secret, such as data that uniquely defines a particular communication session.

Figure 5B:
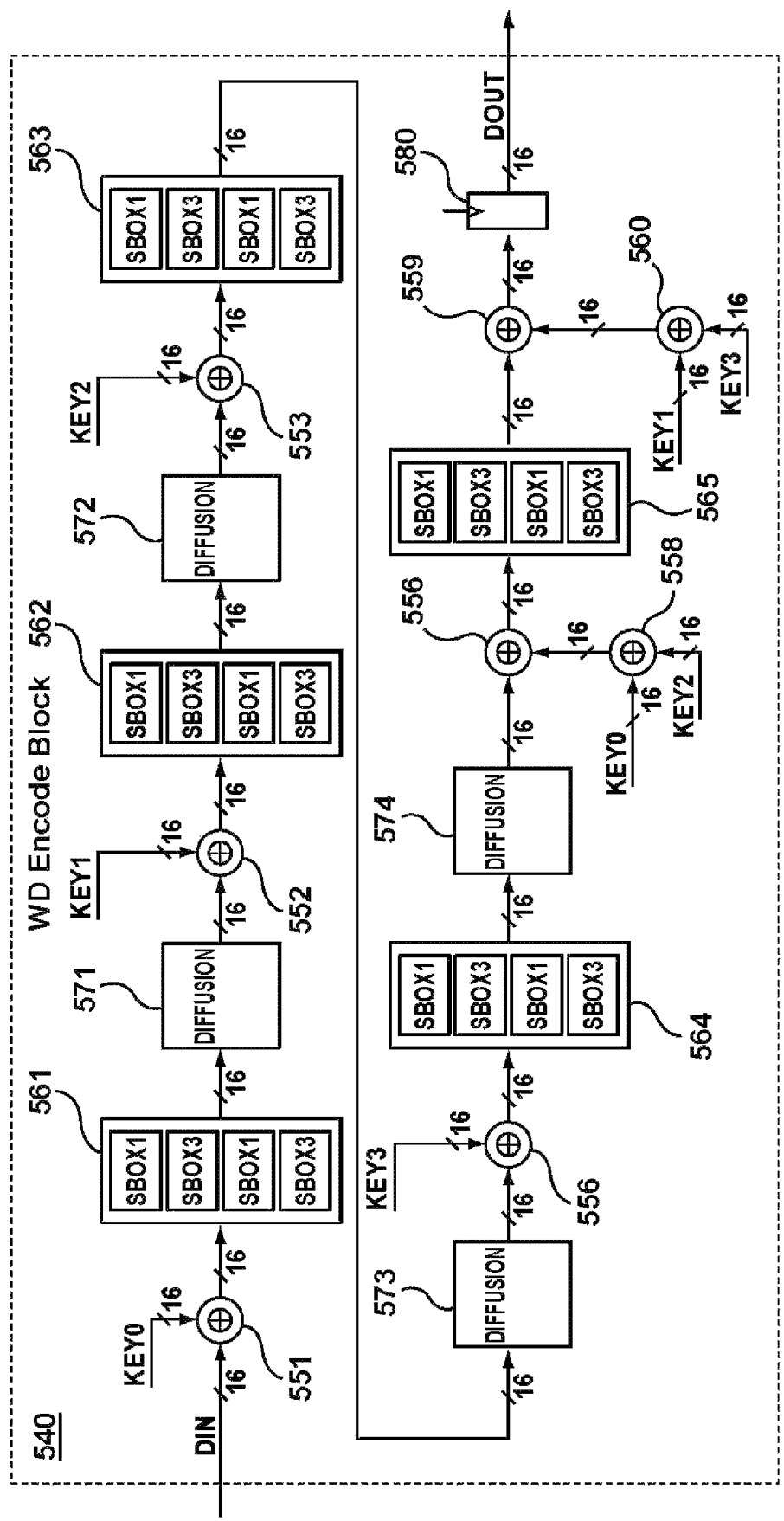
FIG. 5B is an embodiment of a permutation block from FIG. 5A for implementing a WD encode algorithm.

Reference is now made to FIG. 5B, which shows an embodiment of a permutation block 540 implementing a WD encode algorithm. The WD encode algorithm consists of five substitution-permutation rounds. The 64-bit key input to permutation block 540 is distributed into four 16-bit keys. Each round consists of a bitwise XOR with part of the key, a substitution function using S-boxes, and a diffusion operation, in that order.

The WD encode algorithm is provided as an example of any number of pseudorandom permutations that may be implemented in the permutation block 540. In some embodiments, the pseudorandom permutation may be implemented with block ciphers or any variations thereof. Other embodiments may implement other substitution-permutation networks than the WD encode algorithm.

XOR gates 551-558 perform a bitwise XOR with a different part of the key in each successive stage. The result is then passed through a substitution layer consisting of S-boxes, or substitution boxes, 561-565. S-box output is then passed to the permutation layer that, in the first four rounds, consists of diffusion blocks 571-574, and in the final round, consists of XOR gates 559,560 that mix the output with the key material. Final output of permutation block 540 is then stored in permutation block output register 580.

The operation performed by the permutation block 540 may be represented by the following equations:

First Four Rounds $$m \leftarrow m \oplus K_{Round} \text{[key mixing]}$$

$$m \leftarrow S_1(A) \| S_2(B) \| S_3(C) \| S_4(D) \text{[substitution layer]}$$

$$m \leftarrow m \oplus (m<<6) \oplus (m<<10) \text{[permutation layer]}$$

Final Round $$m \leftarrow m \oplus K_0 \oplus K_2 \text{[key mixing]}$$

$$m \leftarrow S_1(A) \| S_2(B) \| S_3(C) \| S_4(D) \text{[substitution layer]}$$

$$m' \leftarrow m \oplus K_1 \oplus K_3 \text{[permutation layer]}$$

in the first four rounds, the diffusion blocks 571-574 perform an XOR operation on the S-box output with two bit-shifted versions of the S-box output. The bit-shift function transposes the bits from the S-box output and may be implemented by connecting the XOR gates to the proper bits.

Other diffusion block implementations may forego the XOR operation and simply transpose the bits of the S-box output. In some embodiments, other diffusion circuits may be used that implement a Cellular Automaton based diffusion function.

The critical timing path of RCP datapath 500 is the setup and hold time of permutation block output register 580, since the deepest combinatorial logic paths flow through permutation block 540. The timing of this path affects the maximum clock rate of the datapath for a targeted hardware platform. Less efficient embodiments may use additional registers to buffer signals in RCP datapath 500, thus requiring additional clock cycles. For example, output buffers may be used between some of the rounds of the substitution-permutation network in order to reduce timing constraints.

Figure 6A:
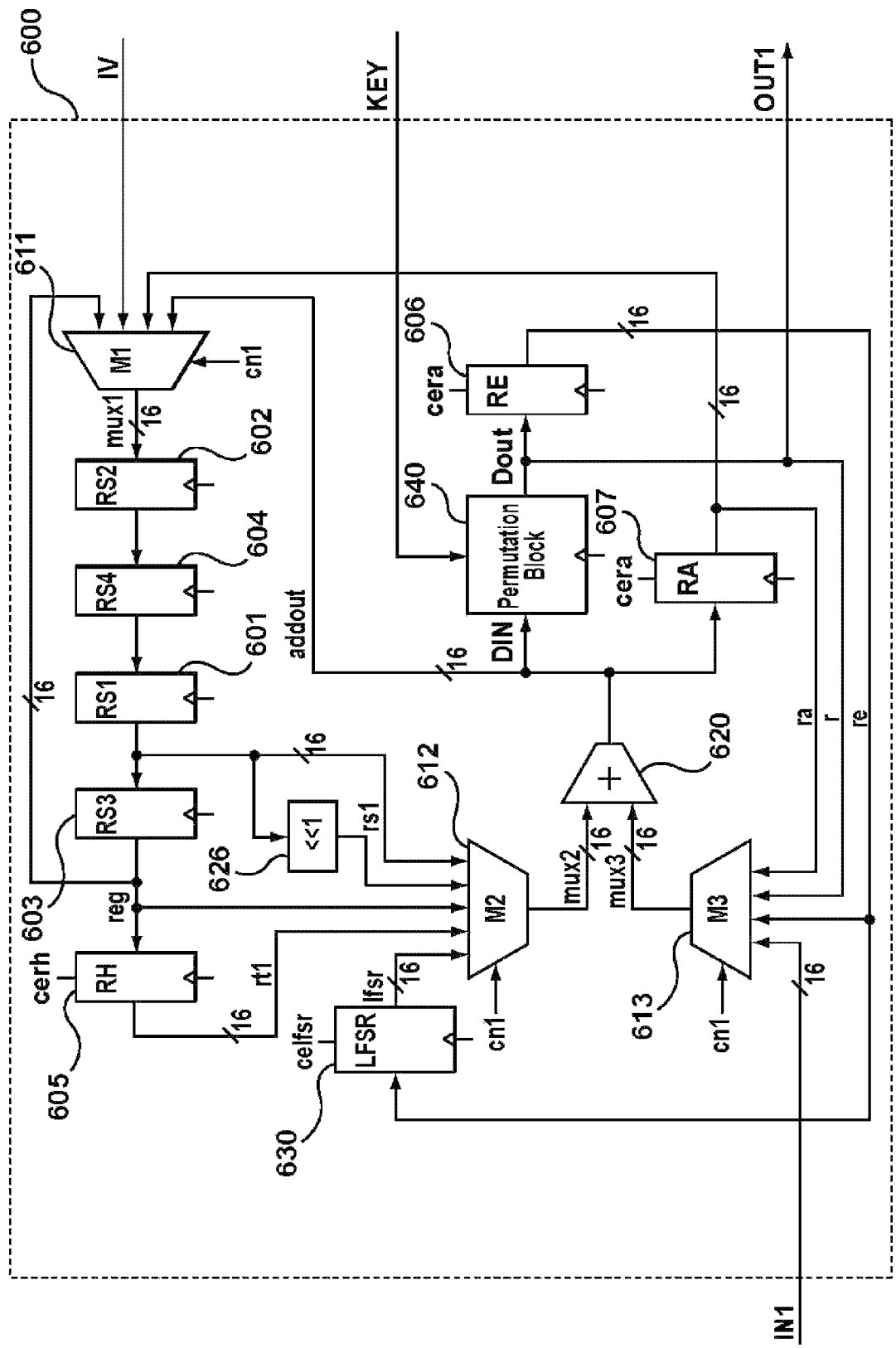
FIG. 6A is an alternative embodiment of a rotor crypto processor datapath for implementing an encryption operation in 16 clock cycles.

Reference is next made to FIG. 6A, which shows an alternative embodiment of a rotor crypto processor datapath 600 that may encrypt a single block of data after initialization in a total of 16 clock cycles. This embodiment demonstrates a size versus speed design optimization tradeoff, and generally operates more slowly than the embodiment shown in FIG. 5A while utilizing less area. FIG. 6A is similar to FIG. 5A, and thus, where suitable a similar numbering scheme is used to refer to similar elements.

The architecture of the RCP datapath 600 consists of four rotor state registers labeled RS1 601, RS2 602, RS3 603 and RS4 604; three multiplexers labeled M1 through M3 611-613; one adder 620; one linear feedback shift register (LFSR) 630; a permutation block 640; and one bit shifter 626. The rotor crypto processor datapath 600 also include three intermediate storage registers 605-607. Control signals (similar to those described to control rotor crypto processor 500 in FIG. 5A) may be used to control data flow in rotor crypto processor datapath 600, including signals for initialization and encryption.

Figure 6B:
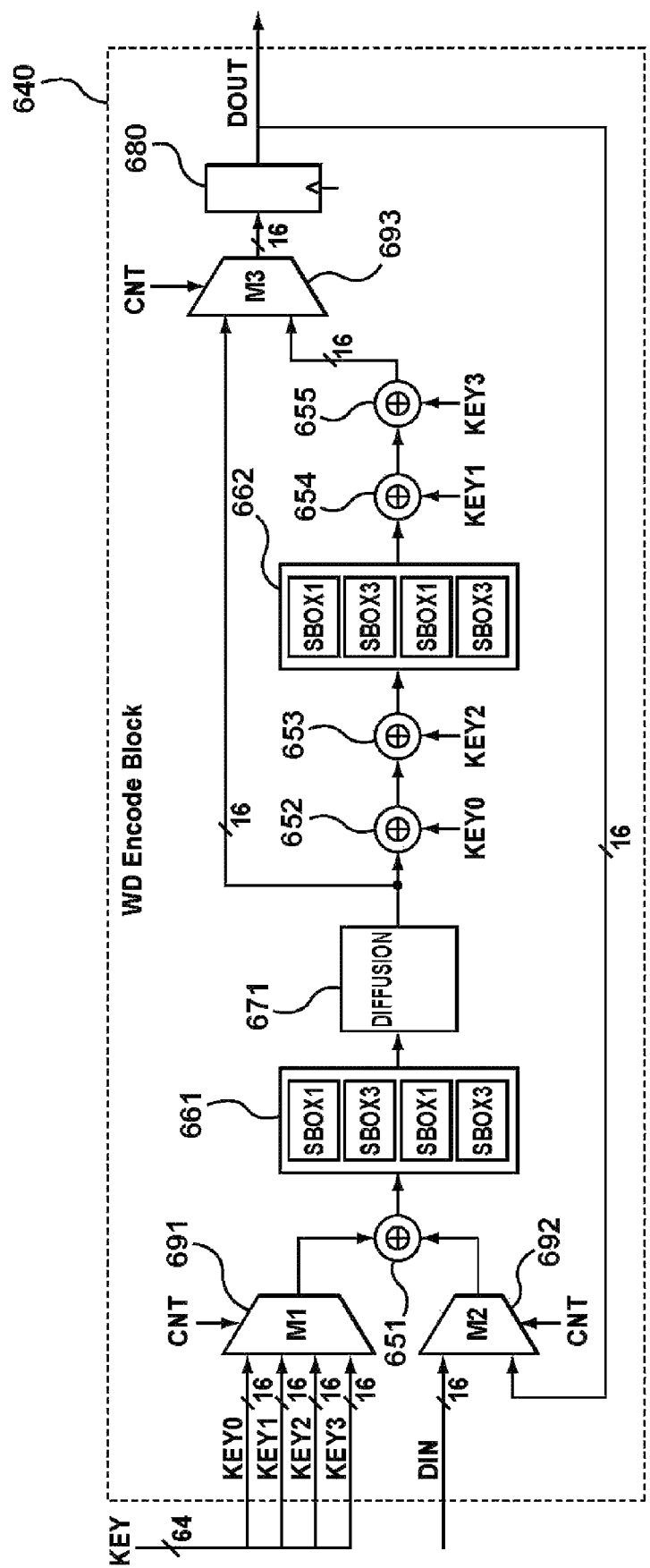
FIG. 6B is an embodiment of a permutation block from FIG. 6A for implementing a WD encode algorithm.

Reference is now made to FIG. 6B, which shows an embodiment of the permutation block 640 implementing a WD encode algorithm over four clock cycles. The encoding algorithm implemented by permutation block 640 is generally that same as or similar to the encoding algorithm implemented by permutation block 540 in FIG. 5B.

In particular, the permutation block 640 uses an output buffer between the substitution-permutation rounds. By performing the encoding operation over four clock cycles, the permutation block 640 is able to reuse the combinational logic elements and reduce the depth of combinatorial logic in the permutation block, and thus allowing for a higher clock frequency, or targeting the design to slower hardware.

In the first clock cycle of operation of the permutation block 640, the multiplexer M1 691 and the multiplexer M2 692 select the inputs to XOR gate 651 to perform a bitwise XOR between a 16-bit portion of the 64-bit key and the input to the permutation block 640. S-Boxes 661 and the diffusion block 671 then carry out the substitution and permutation functions.

The output from the diffusion block 671 is clocked into the permutation block output register 680 at the end of the first clock cycle. The following clock cycles repeat this process with multiplexer M2 692 selecting the output from the diffusion block 671 from the previous clock cycle stored in the permutation output block register 680. In the fourth clock cycle, the multiplexer M3 693 selects the logic path that includes XOR gates 652-655 and S-box 662.

Figure 7:
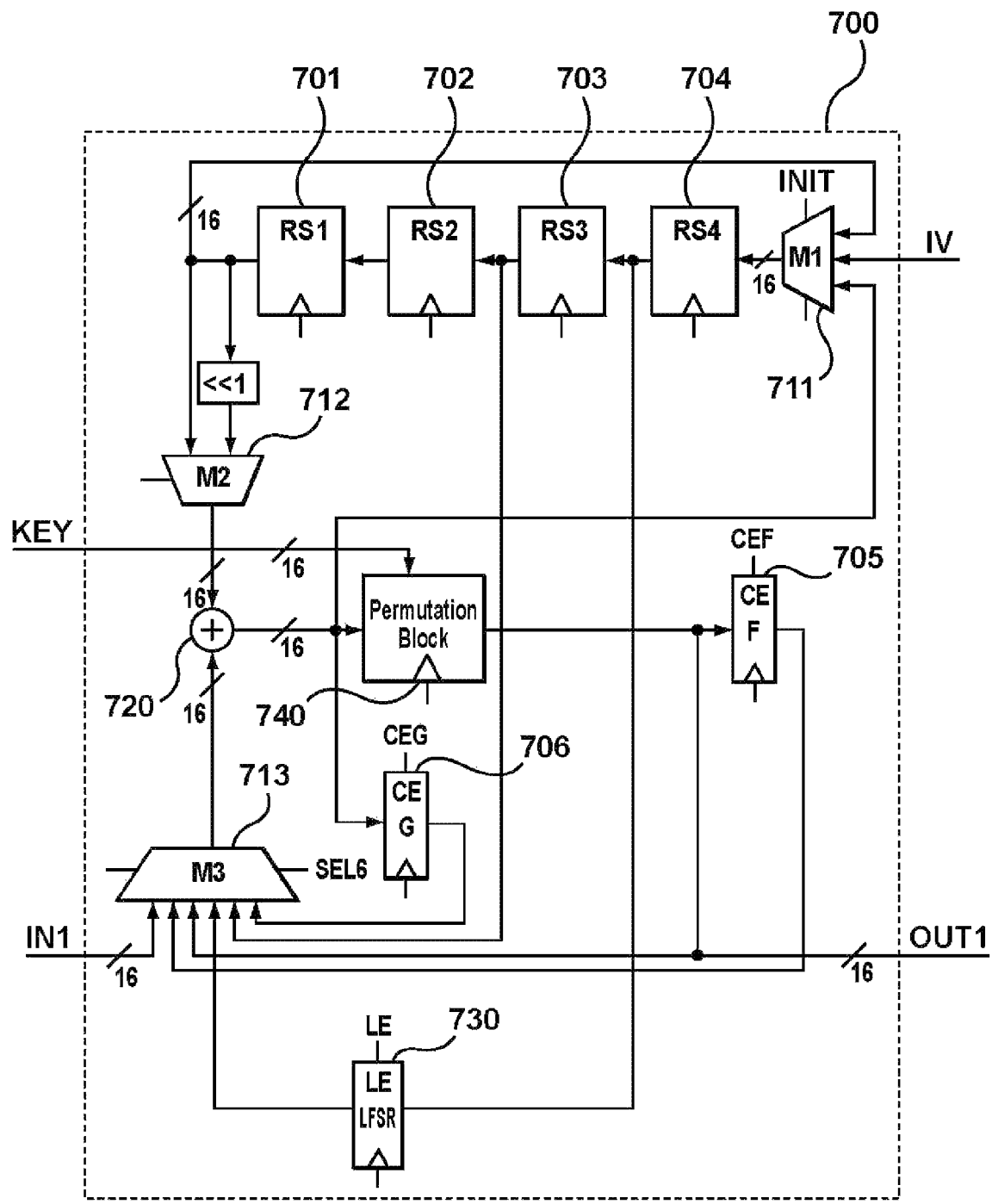
FIG. 7 is an alternative embodiment of a rotor crypto processor datapath for implementing an encryption operation in 20 clock cycles.

Reference is next made to FIG. 7, which shows an alternative embodiment of a rotor crypto processor datapath 700 that may encrypt a single block of data after initialization in a total of 20 clock cycles. FIG. 7 is similar to FIGS. 5A and 6A, and thus, where suitable a similar numbering scheme is used to refer to similar elements.

The architecture of datapath 700 consists of four rotor state registers labeled RS1 701, RS2 702. RS3 703 and RS4 704; three multiplexers labeled M1 through M3 711-713; one adder 720; one linear feedback shift register (LFSR) 730; a permutation block 740; and one bit shifter 726. The rotor crypto processor datapath 700 also include two intermediate storage registers 705,706. Control signals, similar to those described to control rotor crypto processor 500 in FIG. 5A, may be used to control data flow in the rotor crypto processor datapath 700, including signals for initialization and encryption.

Figure 8:
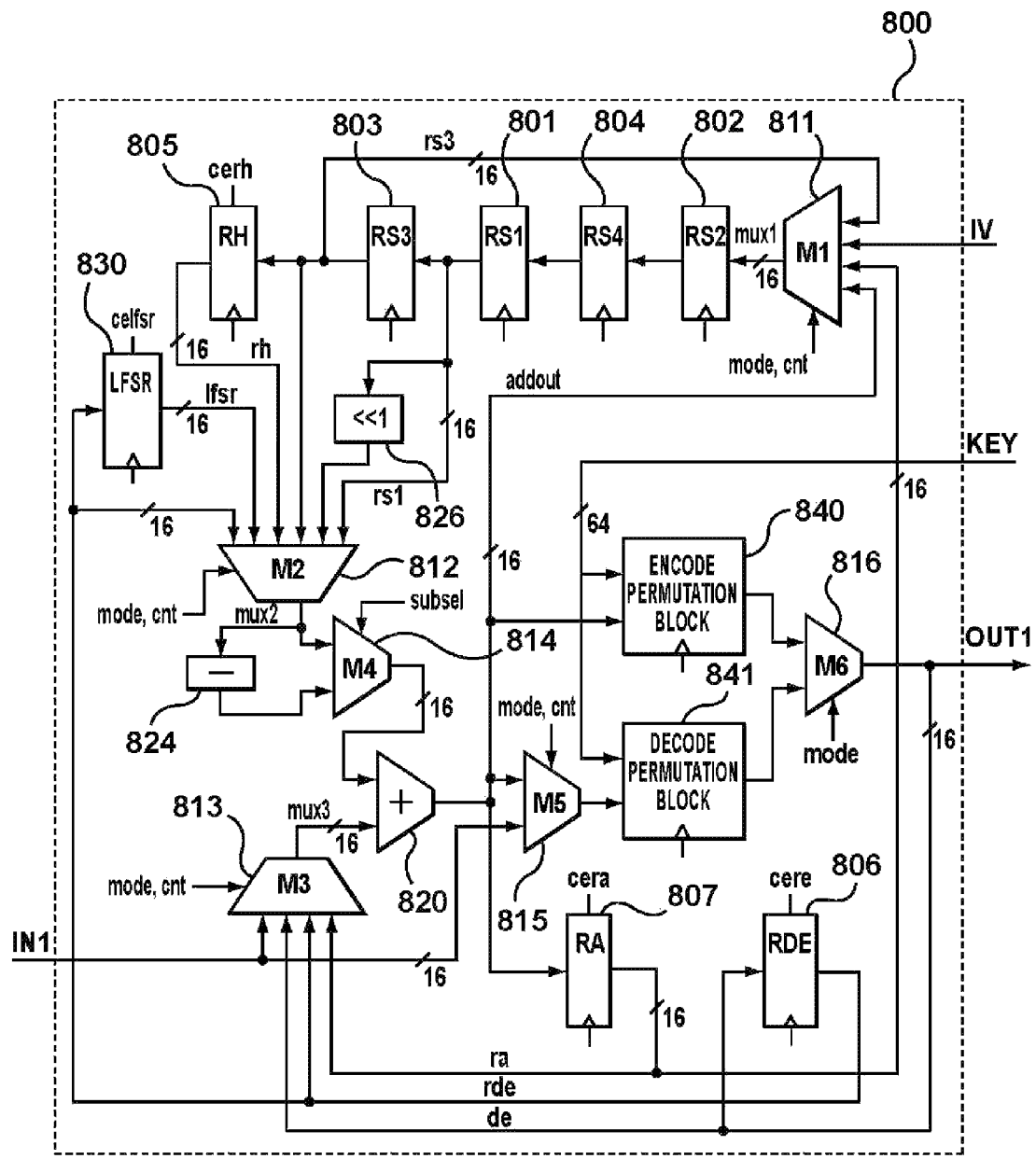
FIG. 8 is an alternative embodiment of a rotor crypto processor datapath that can either encrypt or decrypt a single block of data in 16 clock cycles.

Reference is now made to FIG. 8, which shows an alternative embodiment of a rotor crypto processor datapath 800 that can either encrypt or decrypt a single block of data in 16 clock cycles. The architecture of rotor crypto processor datapath 800 is similar to FIG. 6A, and thus, where suitable a similar numbering scheme may be used to refer to similar elements.

In order to perform decryption, rotor crypto processor datapath 800 includes a subtraction circuit 824 and a decode permutation block 841 for performing the inverse operation of the adder 820 and the encode permutation block 840. Additional control signals are used to control whether the rotor crypto processor datapath 800 operates in an encryption or decryption mode.

Data flow in each of the rotor crypto processor datapath embodiments described above is controlled by control signals driven from a rotor crypto processor controller, such as the rotor crypto processor controller 404 shown in FIG. 4. The rotor crypto processor controller may be implemented using variety of circuits, with the complexity of the controller varying with complexity of the datapath. For example, a rotor crypto processor controller for controlling the rotor crypto data path 800 in FIG. 8 would tend to be more complex in that it controls both encryption and decryption.

Since the control signals are mainly used to select multiplexer output and enable registers, the more multiplexers and registers in the datapath tend to result in a more complex controller implementation.

A rotor crypto processor controller may be implemented as a state machine using a register or memory to store the control state variable, a combinational logic block to determine the state transitions, and a second block of combinational logic that determines the control signals output from the state machine. The state control variables and state transition logic may be implemented using one or more counters.

Figure 9:
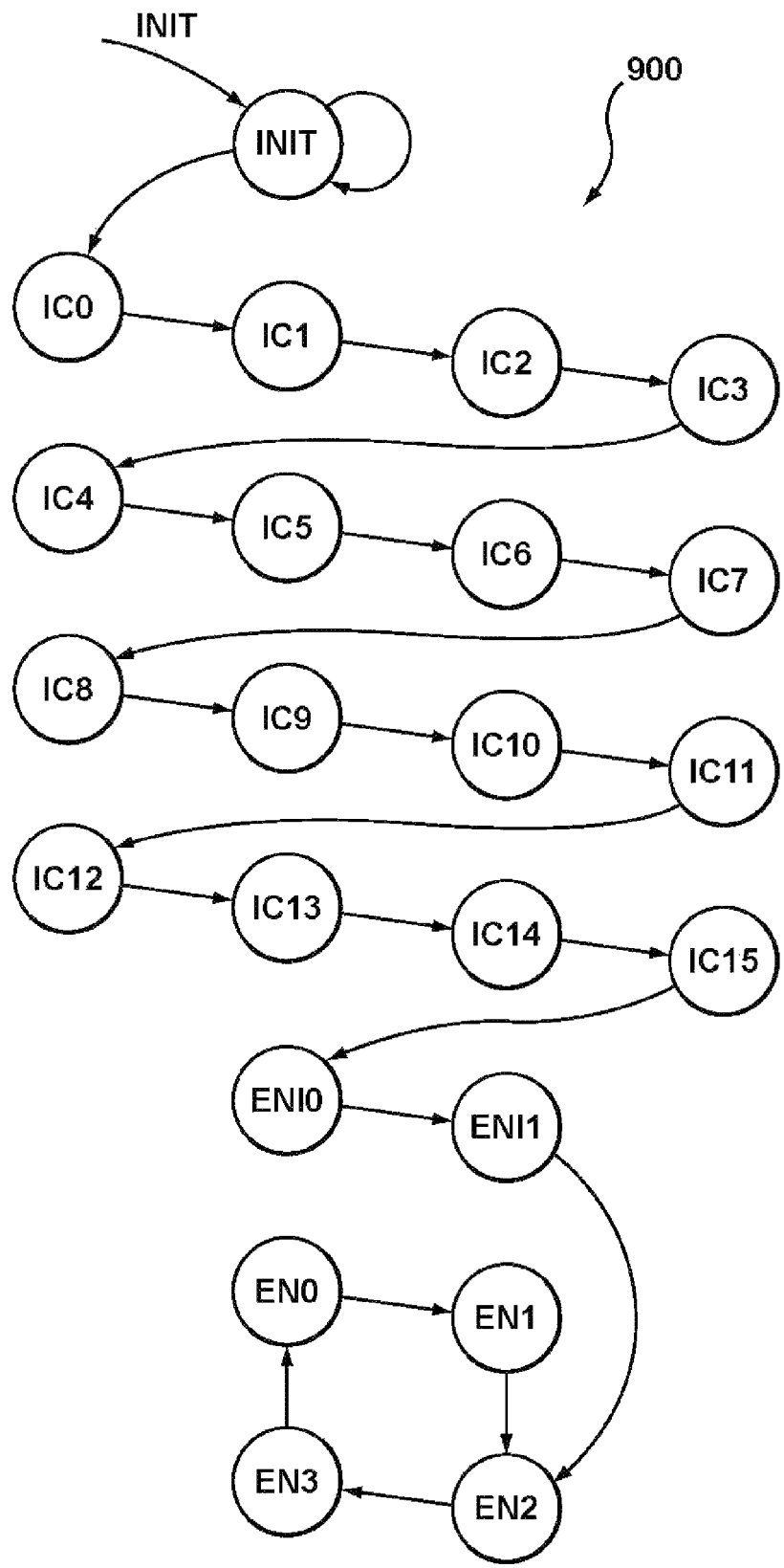
FIG. 9 is a state machine diagram that may be used to implement a rotor crypto processor controller for a rotor crypto processor datapath.

Reference is next made to FIG. 9, which shows a state machine diagram 900 that may be used to implement a rotor crypto processor controller for a rotor crypto processor datapath, such as the RCP datapath 500 shown in FIG. 5A, that performs the encryption operation in four clock cycles.

Transitions in the state machine diagram 900 are controlled by the INIT signal. When the INIT signal is asserted, the state machine transitions to the INIT state and remains in this state while the INIT signal is asserted.

The INIT state is used to load the initialization vector into the rotor state registers. When the INIT signal is no longer being asserted, the state machine transitions to a rotor initialization process over the next 16 clock cycles represented by states IC0 through IC15.

After initialization the state machine enters the ENI0 state. At this point the rotor crypto processor is ready to begin encrypting data or perform additional internal state encryptions.

States ENI0 and ENI1 are special cases of the state machine for first two clock cycles after the initialization due to the pipelined connection of the rotor state registers in the rotor crypto processor datapath 500 in FIG. 5A. State EN3 represents the final cycle of the encryption process when the ciphertext is output, for example, on the output labeled 'out1' of rotor crypto processor datapath 500.

In some embodiments, the state machine may drive a signal to indicate that the ciphertext is available on the output of the datapath in the final clock cycle of the encryption operation.

The state machine may also include idle states that are entered after the state machine has initialized the rotor state registers or completed an encryption cycle if there are no data blocks available for encryption. The state machine could transition to an encryption state on a signal indicating that there is a data block available on the input to the datapath.

Reference is next made to Table 1, which shows a state machine definition that describes the control of multiplexer and register update logic to be used with state machine diagram shown in FIG. 9 to control the rotor crypto processor datapath of FIG. 5A. For each state in Table 1, the "Multiplexer Selection" column shows the relevant multiplexer selections using the label from FIG. 5A of the input bus into the multiplexer.

The "Register Updates" column shows how the rotor state registers are updated. Due to the pipelined data flow arrangement of the rotor state registers RS1, RS2, RS3, and RS4 in RCP datapath 500, each register may be updated only once each encryption cycle, and in order. As a result, the RS1 rotor register is not updated until the EN0 state of the next encryption cycle, and the RS2 rotor register is not updated until the EN1 state of the next encryption cycle. The register updates implement the Hummingbird encryption process generally described by the equations shown in FIG. 2.

TABLE 1

State Definitions

| State | Multiplexer Selection | Register Updates | Description |
|---|---|---|---|
| INIT | M5: IV | rs1 ← rs2<br>rs2 ← rs3<br>rs3 ← rs4<br>rs4 ← mux5 | State machine enters this state unconditionally whenever INIT input is high at rising edge of the clock signal. Data is advanced from IV input through the rotor registers as long as the INIT signal remains high. |
| IC0 | M1: 2 * rs1<br>M2: SSID<br>M3: rs3<br>M5: rs1<br>M6: m2add<br>M7: m3add | | State machine enters this state from INIT state when INIT input is low at rising edge of the clock. Note that the 2 * rs1 term is the rs1 value shifted right by 1 bit. |

TABLE 1-continued

State Definitions

| State | Multiplexer Selection | Register Updates | Description |
|---|---|---|---|
| IC1 | M1: rs1(rs2)<br>M2: wd<br>M5: m2add<br>M6: m2add<br>M7: m2add | rs2' ← m2add<br>(rs2 + v12) | |
| IC2 | M1: rs1(rs3)<br>M2: wd<br>M5: m2add<br>M6: m2add<br>M7: m2add | rs3' ← m2add<br>(rs3 + v23) | |
| IC3 | M1: rs1(rs4)<br>M2: wd<br>M5: m2add<br>M6: m2add<br>M7: m2add | rs4' ← m2add<br>(rs4 + v34) | |
| IC4 | M1: rs1(rs1)<br>M2: wd<br>M3: rs3<br>M5: m2add<br>M6: 2 * m2add<br>M7: m3add | rs1' ← m2add<br>([rs1] + [ct]) | Note new value of rs1 is m2add. Input to WD encode block is this value shifted to right by one bit and added to the value of rs3. This calculation is also performed in states IC8 and IC12. |
| IC5 | M1: rs1(rs2)<br>M2: wd<br>M5: m2add<br>M6: m2add<br>M7: m2add | rs2' ← m2add<br>(rs2 + v12) | |
| IC6 | M1: rs1(rs3)<br>M2: wd<br>M5: m2add<br>M6: m2add<br>M7: m2add | rs3' ← m2add<br>(rs3 + v23) | |
| IC7 | M1: rs1(rs4)<br>M2: wd<br>M5: m2add<br>M6: m2add<br>M7: m2add | rs4' ← m2add<br>(rs4 + v34) | |
| IC8 | M1: rs1(rs1)<br>M2: wd<br>M3: rs3<br>M5: m2add<br>M6: 2 * m2add<br>M7: m3add | rs1' ← m2add<br>([rs1] + [ct]) | |
| IC9 | M1: rs1(rs2)<br>M2: wd<br>M5: m2add<br>M6: m2add<br>M7: m2add | rs2' ← m2add<br>(rs2 + v12) | |
| IC10 | M1: rs1(rs3)<br>M2: wd<br>M5: m2add<br>M6: m2add<br>M7: m2add | rs3' ← m2add<br>(rs3 + v23) | |
| IC11 | M1: rs1(rs4)<br>M2: wd<br>M5: m2add<br>M6: m2add<br>M7: m2add | rs4' ← m2add<br>(rs4 + v34) | |
| IC12 | M1: rs1(rs1)<br>M2: wd<br>M3: rs3<br>M5: m2add<br>M6: 2 * m2add<br>M7: m3add | rs1' ← m2add<br>([rs1] + [ct]) | |
| IC13 | M1: rs1(rs2)<br>M2: wd<br>M5: m2add<br>M6: m2add<br>M7: m2add | rs2' ← m2add<br>(rs2 + v12) | |
| IC14 | M1: rs1(rs3)<br>M2: wd<br>M5: m2add<br>M6: m2add<br>M7: m2add | rs3' ← m2add<br>(rs3 + v23) | |

TABLE 1-continued

State Definitions

| State | Multiplexer Selection | Register Updates | Description |
|---|---|---|---|
| IC15 | M1: rs1(rs4)<br>M2: wd<br>M5: m2add<br>M6: m2add<br>M7: m2add | rs4' ← m2add<br>(rs4 + v34) | Last rotor initialization cycle state. |
| ENI0 | M1: rs1(rs1)<br>M2: wd<br>M3: PT<br>M5: m2add<br>M6: m2add<br>M7: m3add | rs1' ← m2add<br>([rs1] + [ct])<br>lfsr ← wd(ct)\|<br>0x1000 | This is a special case state: the first clock phase following the completion of the initialization cycle, in which the RNG input is low.<br>Note that rs1 is updated with its final initial value during this state. At the same time this initial value is added to the PT input value to serve as input to the wd encoder. During this state the LFSR is initialized. |
| ENI1 | M2: wd<br>M4: rs4(rs1)<br>M5: m2add<br>M6: m2add<br>M7: m2add | rs2p' ← m2add<br>(rs2 + v12)<br>t1reg ← m4add<br>(rs1 + v12)<br>lfsr' ←<br>lfsr_update(lfsr) | This is a special case state: the second clock phase following the completion of the initialization cycle. Behavior of this state is the same for RNG = 0 and RNG = 1.<br>Note that rs2 is left partially updated during this state (notated as rs2p). The second part of its update occurs during the next EN1 state.<br>The difference between this state and the EN1 state is in how the rs2 value is updated. |
| EN0 | M1: t1reg<br>M2: PT<br>M5: t1reg<br>M6: m2add<br>M7: m2add | rs1' ← t1reg([rs1]) | This is the normal case for the first clock phase of an encryption cycle, when the RNG input is low.<br>Note that [rs1] is updated from the rs1 + v34 sum calculated during the previous encryption cycle, which was saved in t1reg. |
| EN1 | M1: rs1(rs2)<br>M2: wd<br>M3: rs3(rs4)<br>M4: rs4(rs1)<br>M5: m2add<br>M6: m2add<br>M7: m3add | rs2p' ← m3add<br>(rs2p + rs4 + v12)<br>t1reg ← m4add<br>(rs1 + v12)<br>lfsr' ←<br>lfsr_update(lfsr) | This is the normal case for the second clock phase of an encryption cycle. Behavior of this state is the same for RNG = 0 and RNG = 1.<br>Note that rs2 used for wd input is the sum of rs4 and partial rs2 value rs2p calculated during the previous encryption cycle. The rs2' value is not fully updated until the next EN1 state.<br>During this state the lfsr is also updated. |
| EN2 | M1: rs1(rs3)<br>M2: wd<br>M3: lfsr<br>M5: m3add<br>M6: m2add<br>M7: m2add | rs3' ← m3add<br>(rs3 + v23 + lfsr) | This state is the third clock phase of any encryption cycle, whether the RNG input is low or high.<br>The rs3 value is updated during this state. |
| EN3 | M1: rs1(rs4)<br>M2: wd<br>M3: t1reg<br>M4: rs2(rs1)<br>M5: m3add<br>M6: m2add<br>M7: m2add | rs4' ← m3add<br>(rs4 + v34 + t1reg<br>(rs1 + v12))<br>t1reg ← m4add<br>(rs1 + v34) | This state is the fourth clock phase of any encryption cycle, whether the RNG input is low or high. The rs4 value is updated during this state. The t1reg is updated with the next value of rs1 during this state. |
| ENI0,<br>RNG = 1 | M1: rs1(rs1)<br>M2: wd<br>M3: rs3<br>M5: m2add<br>M6: 2 * m2add<br>M7: m3add | rs1' ← m2add<br>([rs1] + [ct])<br>lfsr ← wd(ct)\|<br>0x1000 | This is a special case state: the first clock phase following the completion of the initialization cycle, in which the RNG input is high. The sum rs1 + rs3 is used instead of the PT input for pseudo-random number generation.<br>Note that rs1 is updated with its final initial value during this state.<br>During this state the LFSR is initialized. |
| EN0,<br>RNG = 1 | M1: t1reg<br>M2: PT<br>M5: t1reg<br>M6: m2add<br>M7: m2add | rs1' ← t1reg([rs1]) | This is the normal case for the first clock phase of an encryption cycle, when the RNG input is high. The sum rs1 + rs3 is used instead of the PT input for pseudo-random number generation.<br>Note that the [rs1] value used for wd input and rs1 update is the rs1 + v34 sum calculated during the previous encryption cycle, which was saved in t1reg. |

Figure 10:
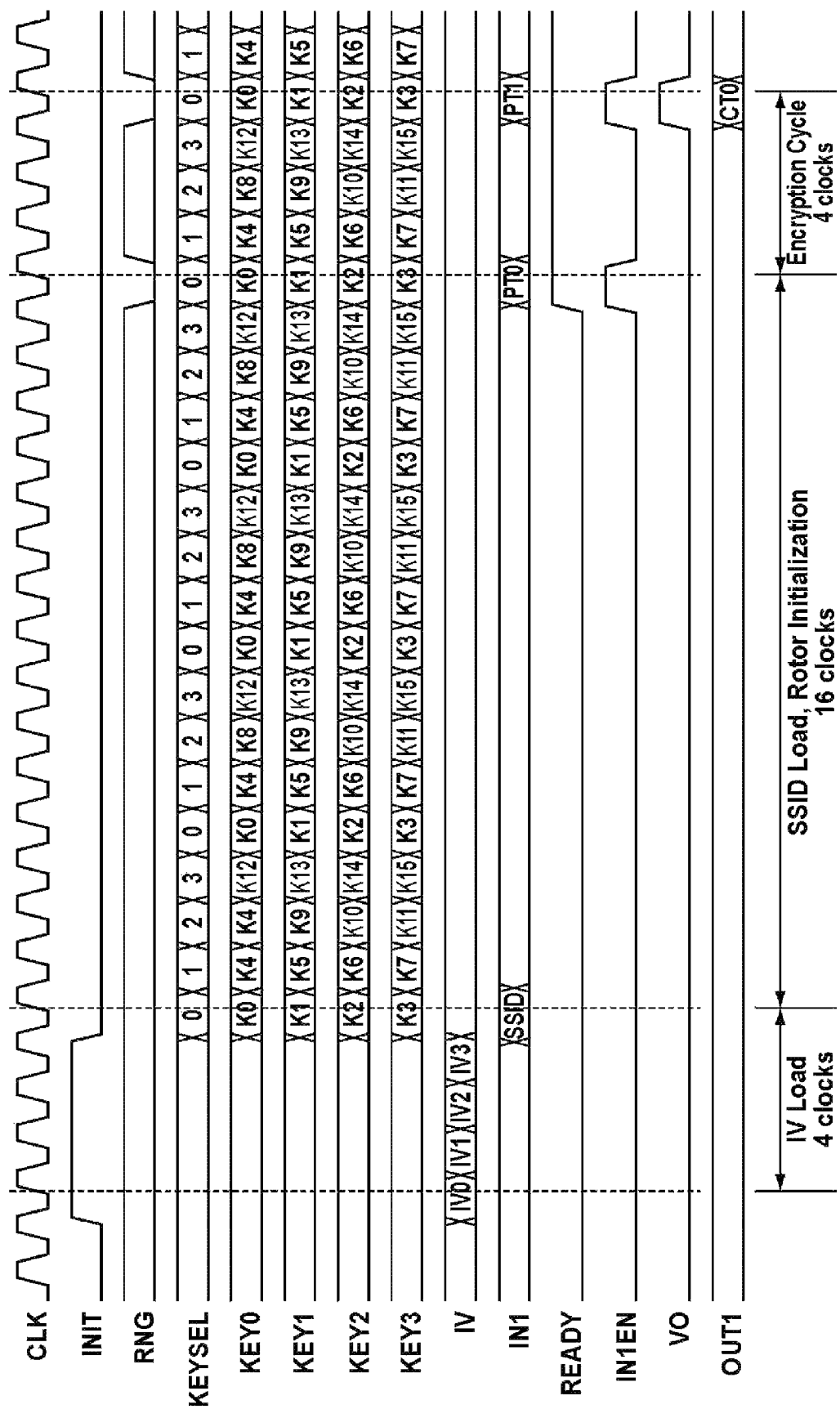
FIG. 10 is a timing diagram of a rotor crypto processor initialization process followed by an encryption cycle of the state machine described in FIG. 9.

Reference is now made to FIG. 10, which shows a timing diagram of a rotor crypto processor initialization process followed by an encryption cycle of the state machine described in FIG. 9. On the first rising clock edge, while the INIT signal is asserted the 64-bit initialization vector is loaded in the rotor crypto processor via the IN1 input in four 16-bit words, one per clock cycle for four clock cycles. On the next rising clock edge after the INIT signal is low, the rotor crypto processor begins the initialization process represented by states IC0 through IC15. In the embodiment shown in FIG. 10, on the first rising clock edge on which INIT is low, an additional 16-bit parameter is loaded into the processor on the IN1 input. This is the Session Identifier (SSID).

At the completion of the initialization the controller may drive the READY signal high to indicate that the rotor crypto processor is initialized and ready to encrypt data on IN1.

In encryption mode, represented by states ENI0, ENI1, and EN0-1, the processor executes a continuous series of encryption cycles, each requiring four clock cycles. The input on IN1 is sampled on the first rising clock edge of the cycle, and in some embodiments, may be signaled as valid using the IN1EN signal. Alternatively, if the RNG is signal is driven low during the first clock cycle of the encryption cycle, the rotor crypto processor will generate a random number based on the encryption state of the rotor crypto processor.

The 256-bit key is continually accessed by the rotor crypto processor during the initialization and encryption cycles. The key is accessed 64-bits at a time via the KEY0, KEY1, KEY2, and KEY3 key lane inputs. The state machine of the rotor crypto processor controller may also drive a KEYSEL signal that may be applied to an external 4:1 multiplexer to select the appropriate 64-bit key segment of the 256-bit key.

On the fourth rising clock edge of the encryption cycle, the resulting cipher text is driven out on the OUT1 output. The controller may also assert a VO signal during this clock cycle to indicate that the ciphertext is available.

Figure 13A:
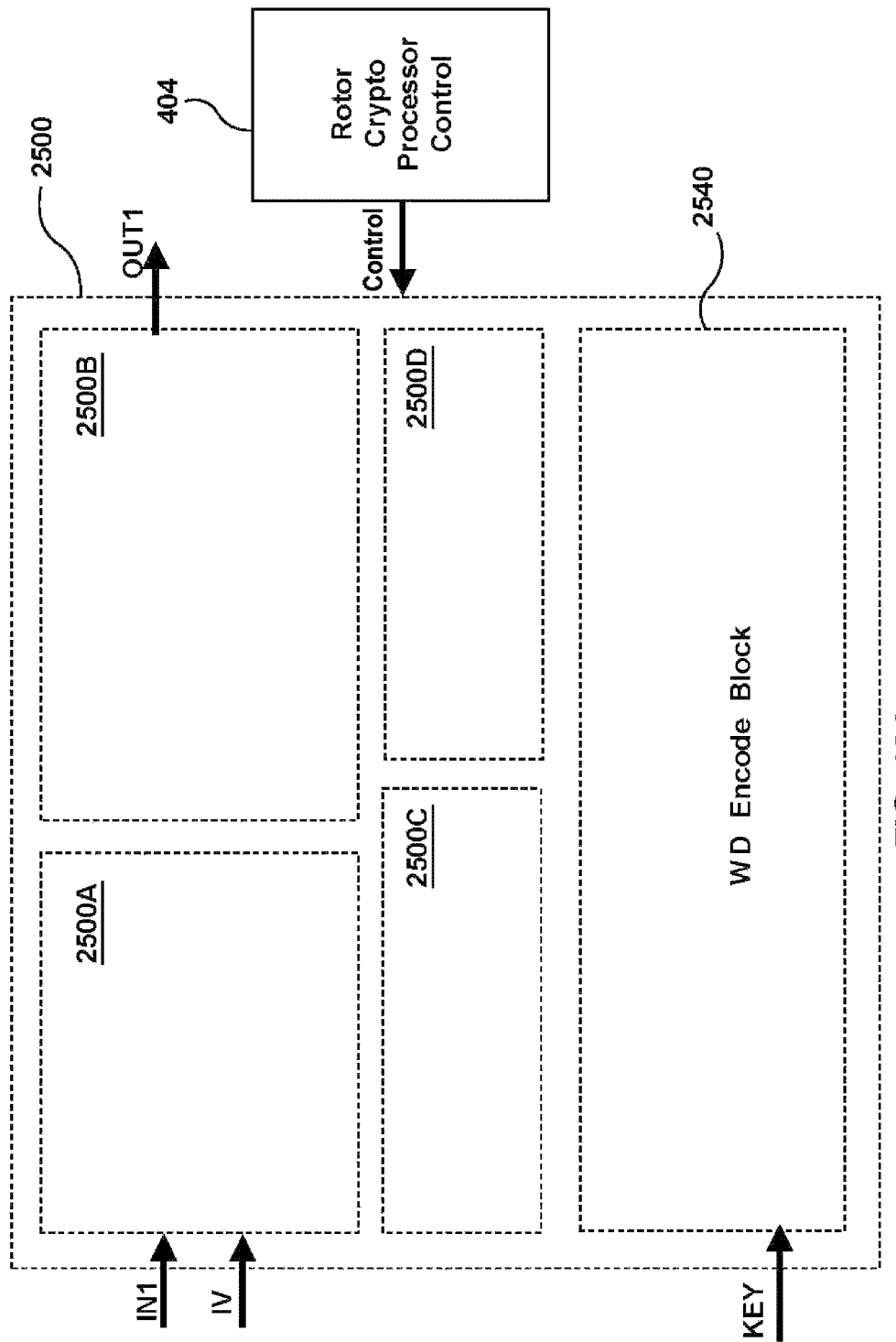
FIGS. 13A to 13E are schematic illustrations of an embodiment of a rotor crypto processor datapath using accumulators for implementing an encryption operation in four clock cycles.
Figure 13B:
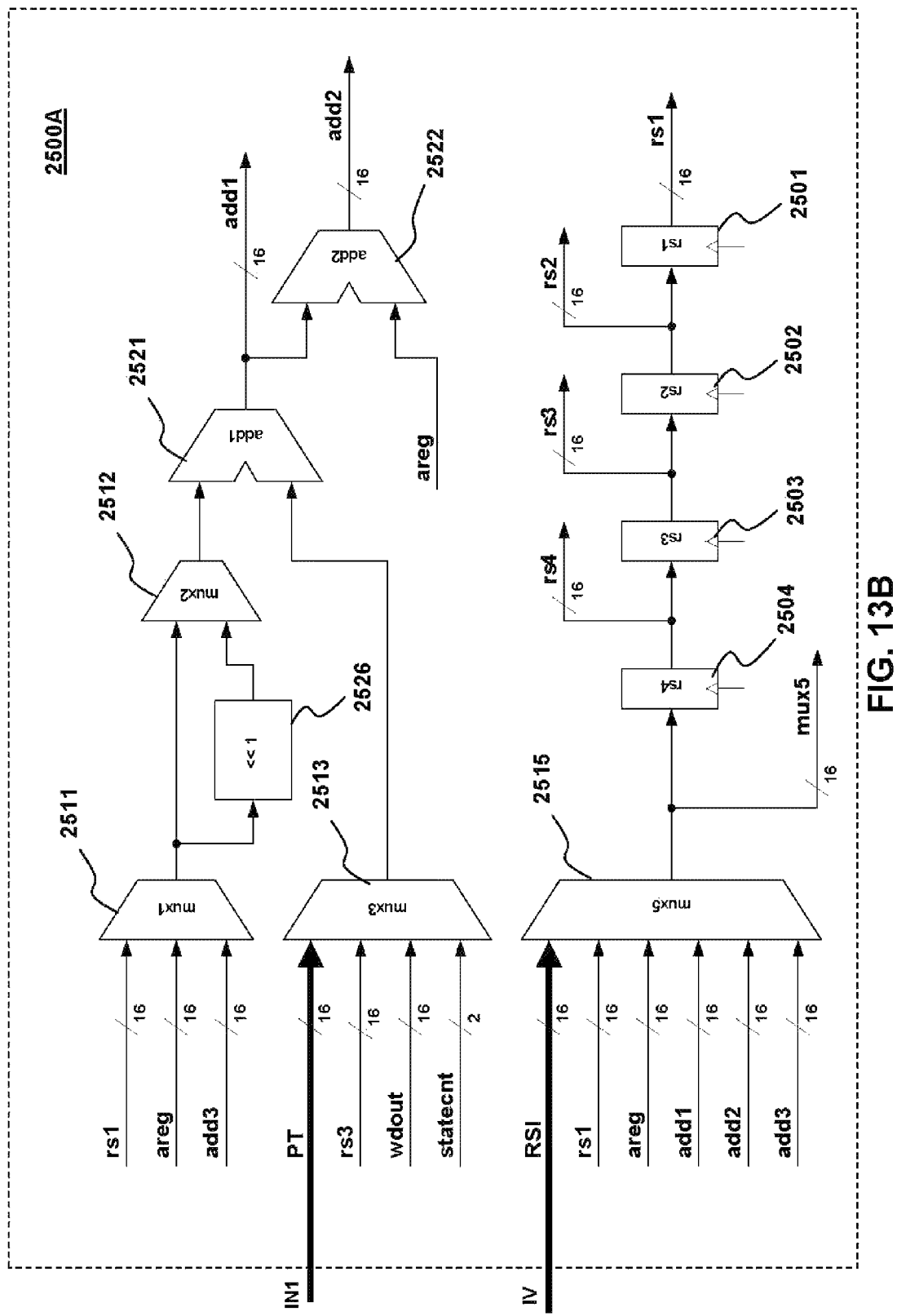
Figure 13C:
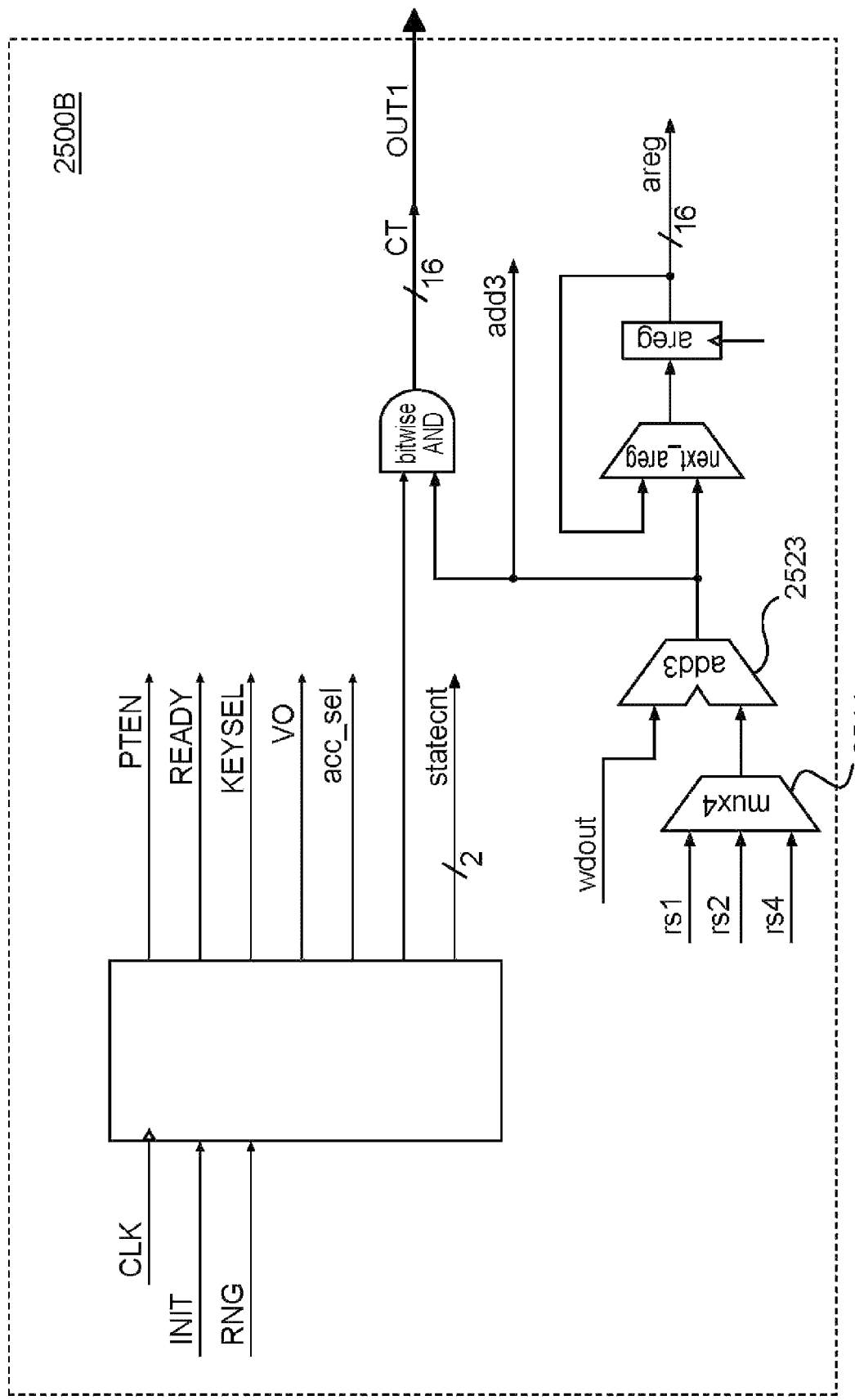
Figure 13D:
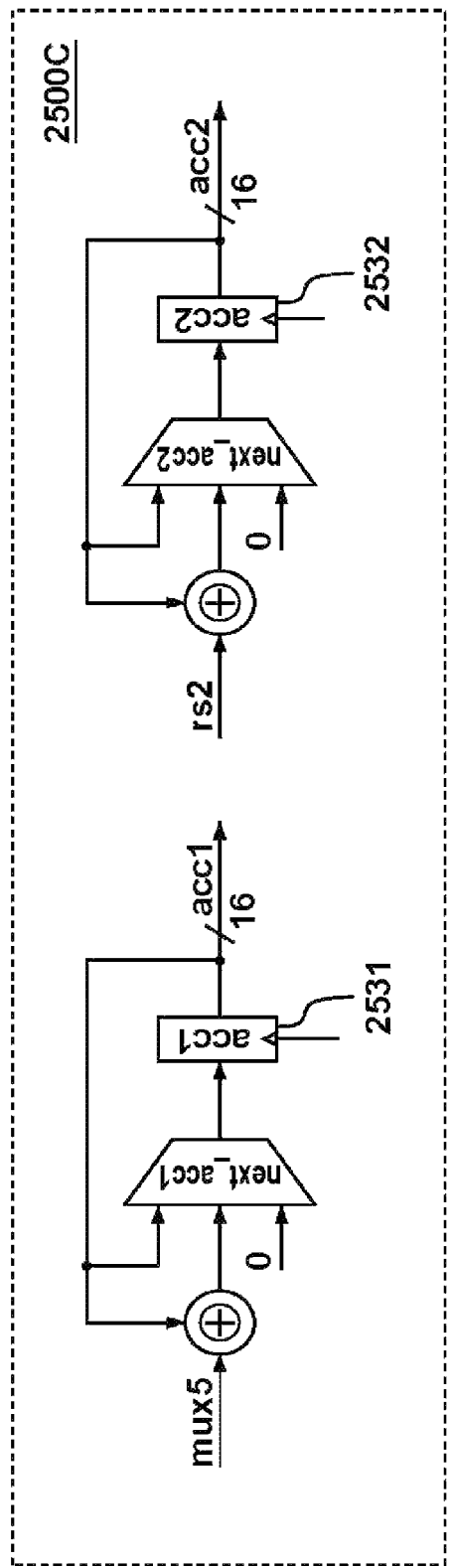
Figure 13E:
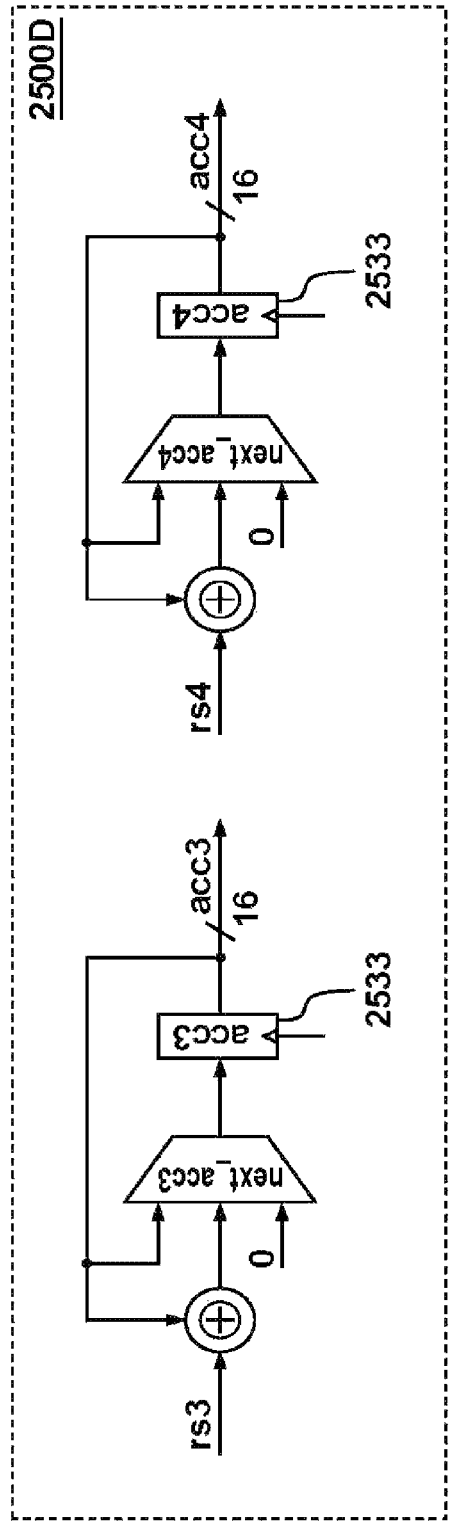

Reference is next made to FIGS. 13A to 13G which show an embodiment of a rotor crypto processor datapath 2500 according to another embodiment. FIGS. 13A to 13E generally show an embodiment that is similar to the embodiment of FIG. 5A with a similar operation, and thus, where appropriate a similar numbering scheme is used to refer to similar elements incremented by 2000. For clarity, the main schematic of the datapath 2500 shown in FIG. 13A is shown broken into several sub-modules 2500A, 25006, 2500C and 2500D shown in FIGS. 13B, 13C, 13D and 13E, respectively.

After initialization, rotor crypto processor datapath 2500 can encrypt a single data block in four clock cycles.

The architecture of the RCP datapath 2500 consists of four rotor state registers labeled RS1 2501, RS2 2502, RS3 2503 and RS4 2504; multiplexers labeled mux1 through mux5 2511-2515; adders 2521-2523; and a permutation block 2540; four accumulators acc1 through acc3 2531-2534. However, unlike the embodiment shown in FIG. 5A there is no LFSR.

Each accumulator 2531-2534 is associated with a particular rotor, e.g., acc1 2531 is associated with the first rotor and. The initial value of each accumulator 2531-2534 is zero.

After each complete encryption/decryption, the value of each accumulator 2531-2534 is updated by XORing the current value of the rotor register with the current value of the accumulator 2531-2534 associated with that rotor.

Figure 13F:
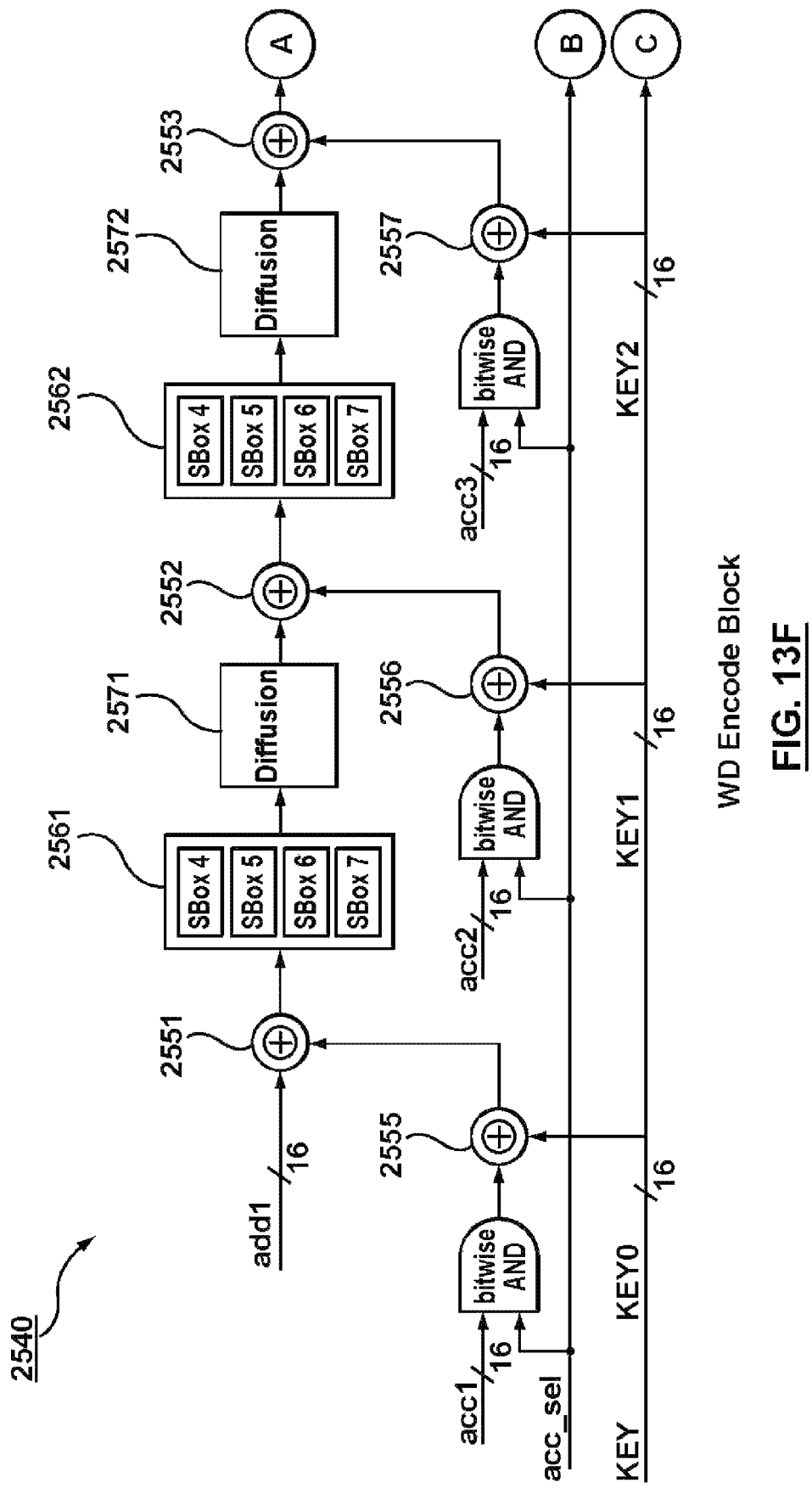
FIGS. 13F to 13G show an embodiment of a permutation block from FIGS. 13A to 13E for implementing a WD encode algorithm.
Figure 13G:
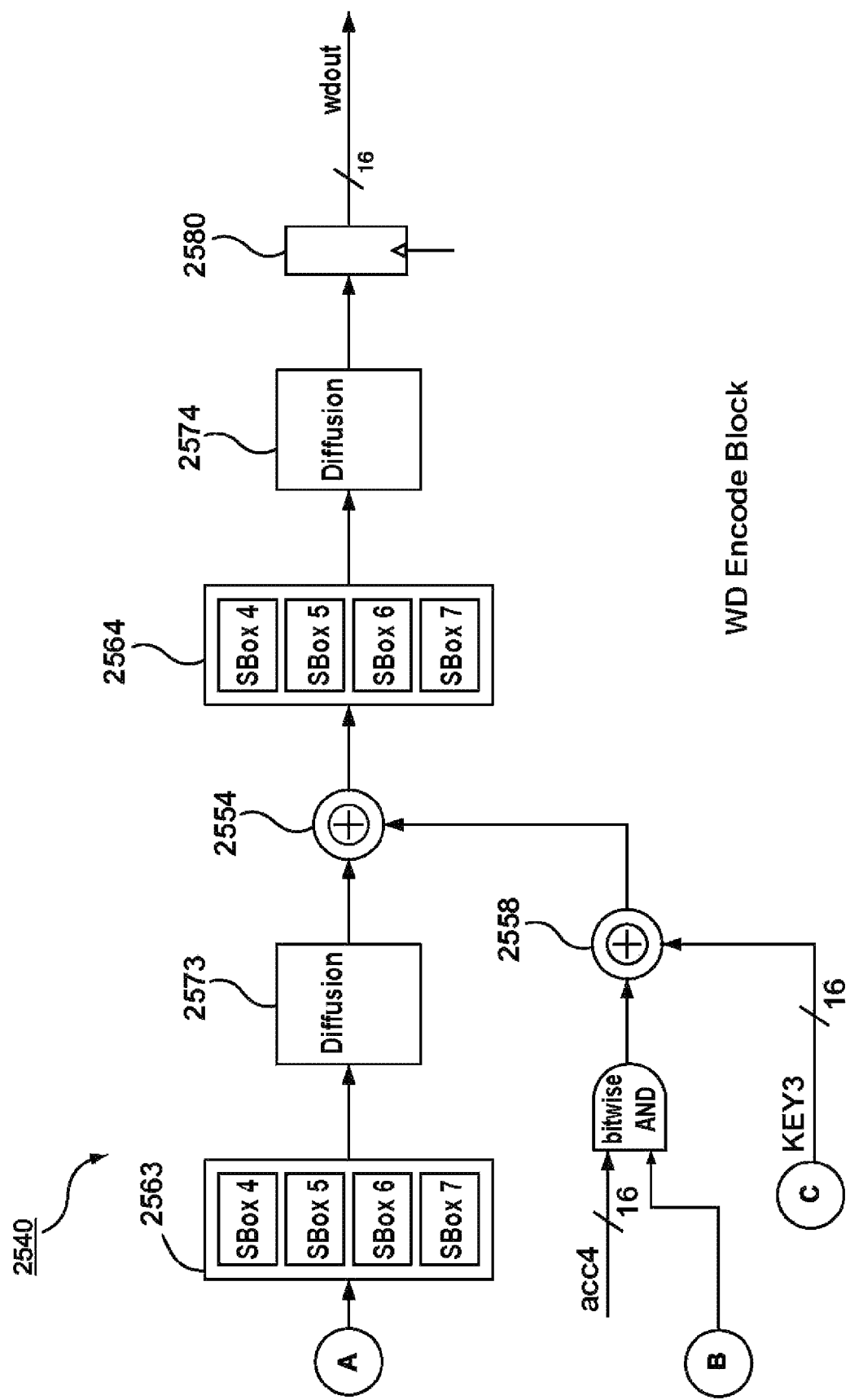
Figure 14A:
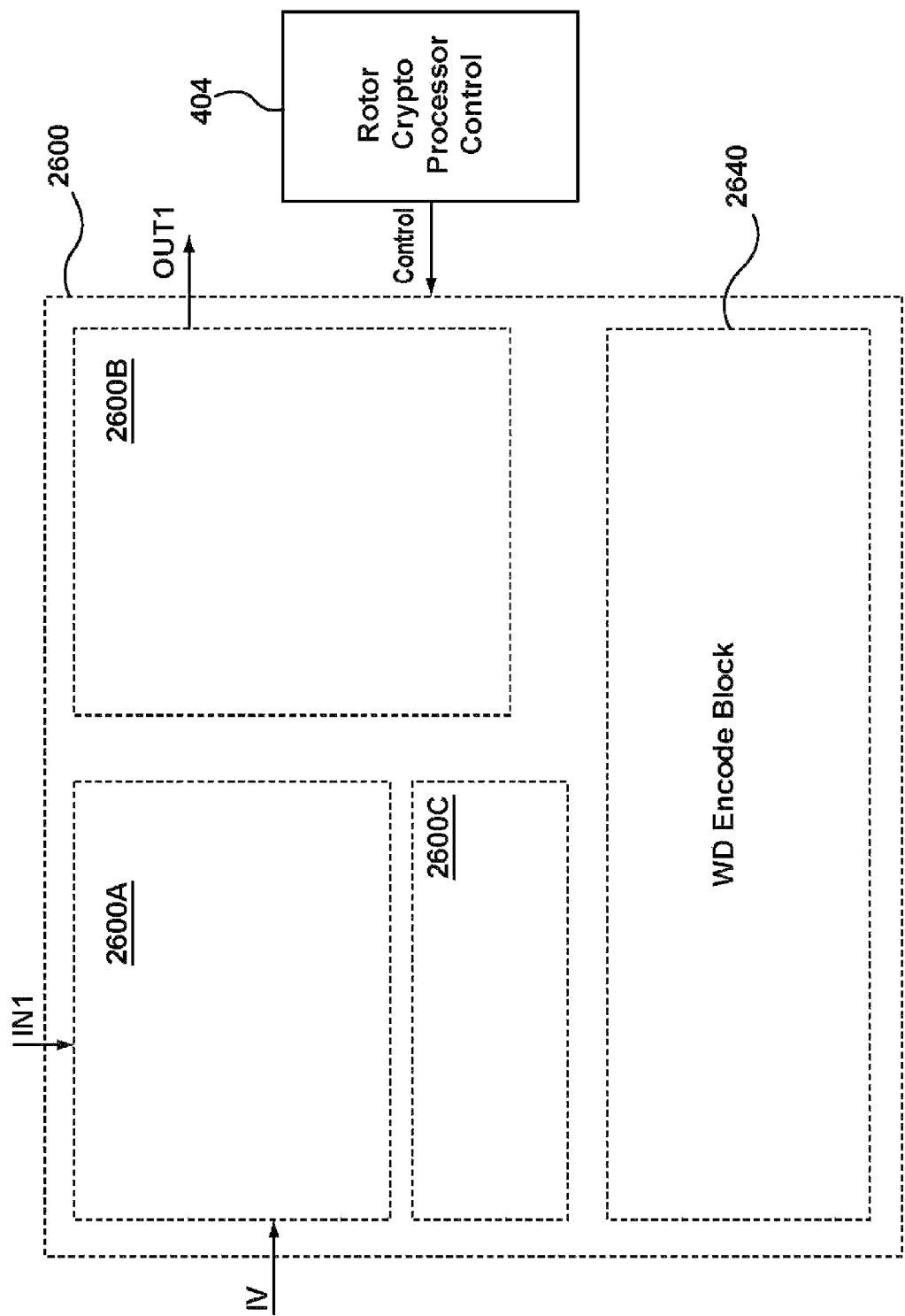
Figure 14B:
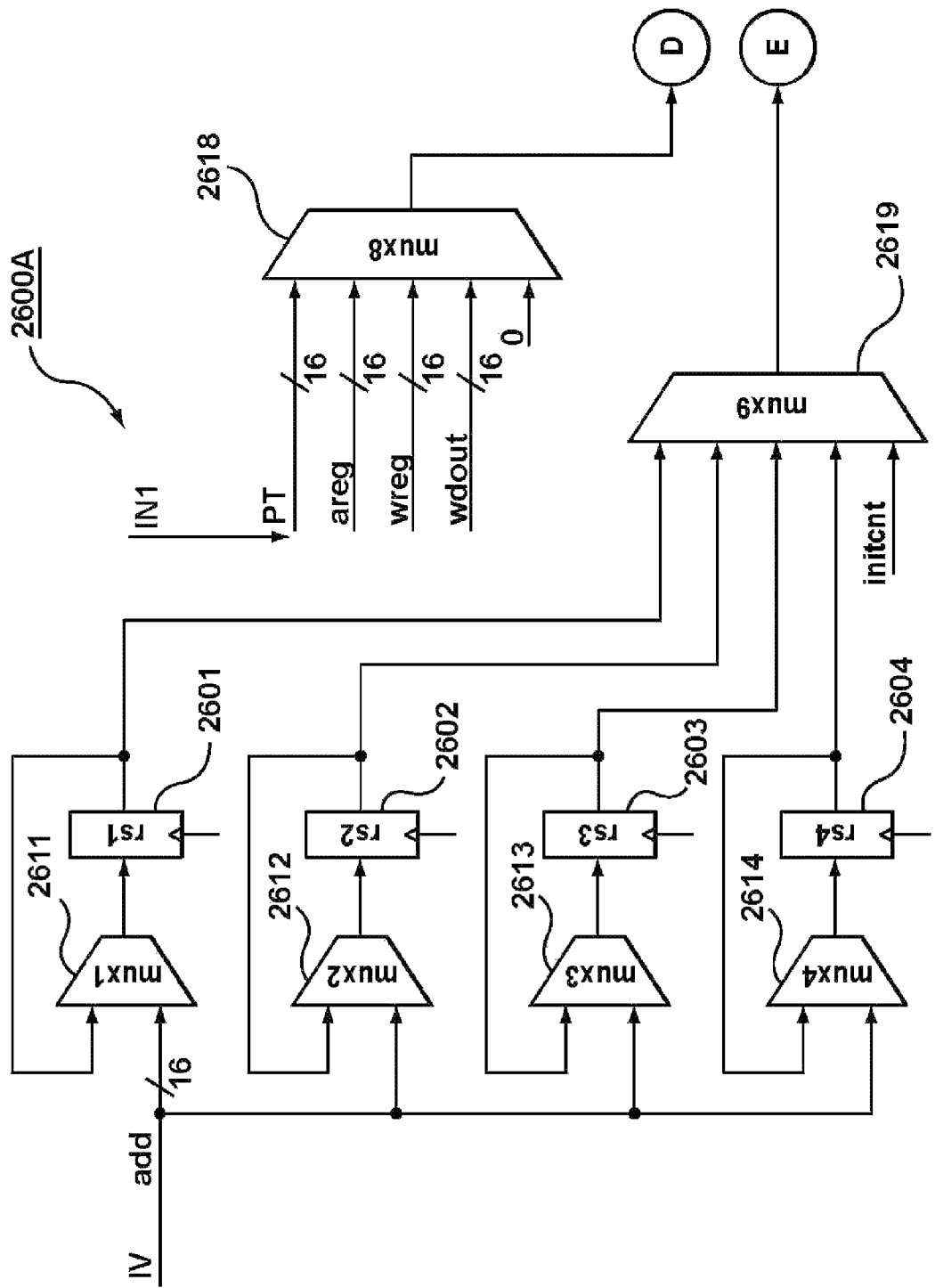
Figure 14D:
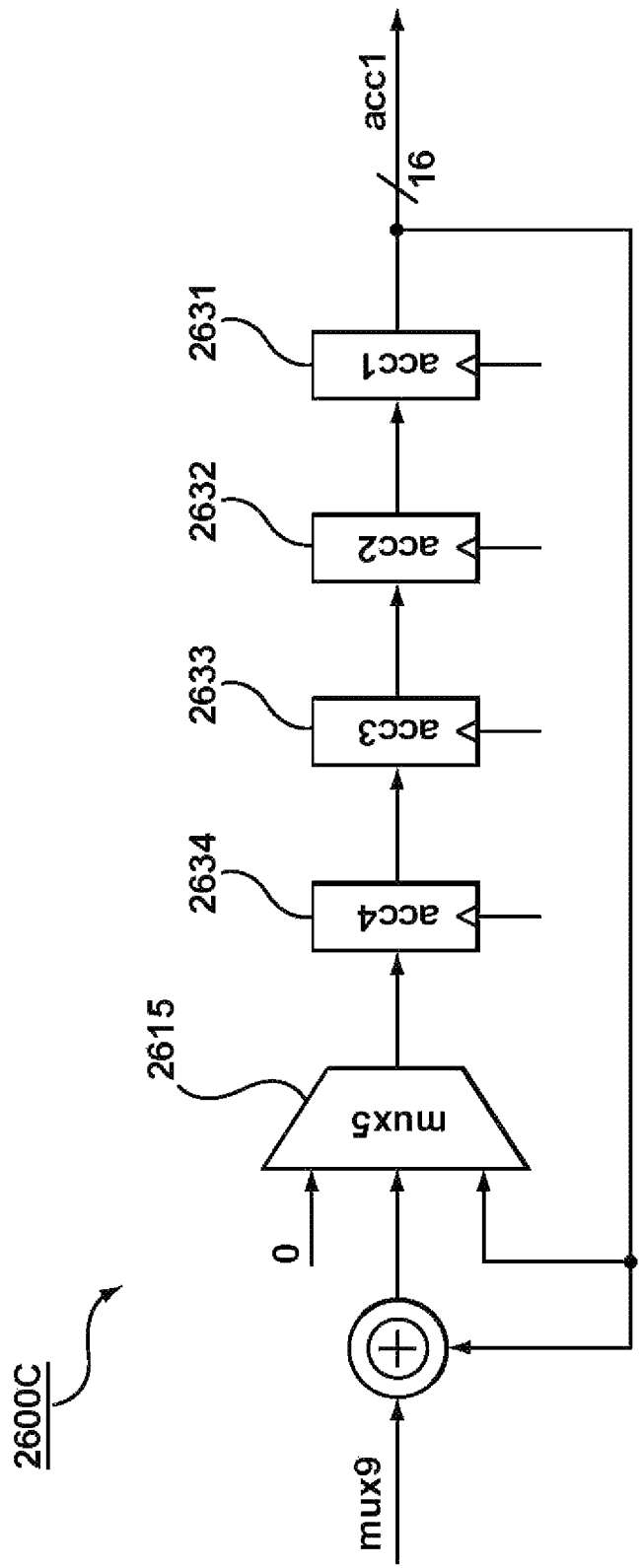
Figure 14E:
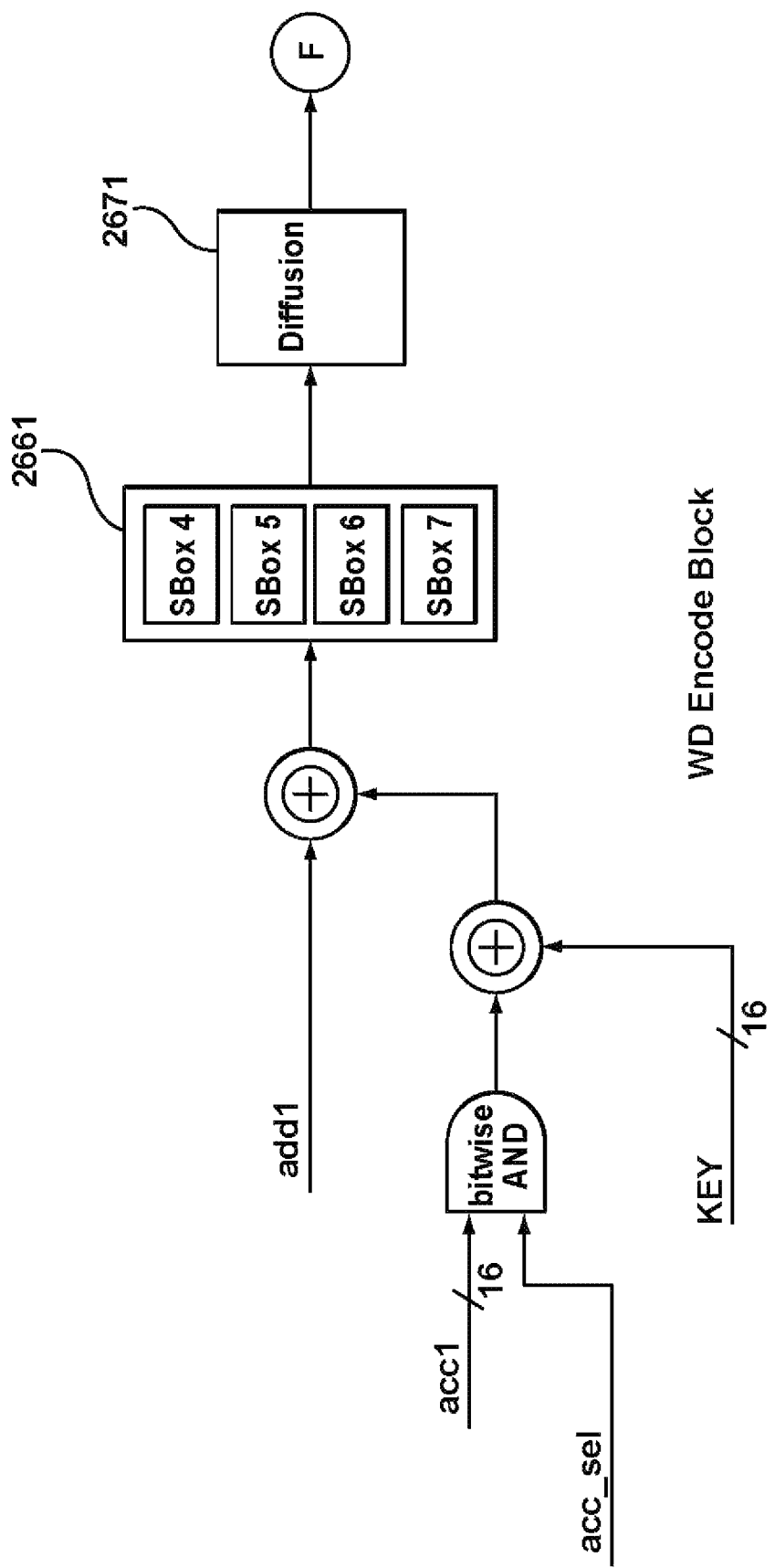
FIGS. 14E to 14F show an embodiment of a permutation block from FIGS. 14A to 14D for implementing a WD encode algorithm.
Figure 14F:
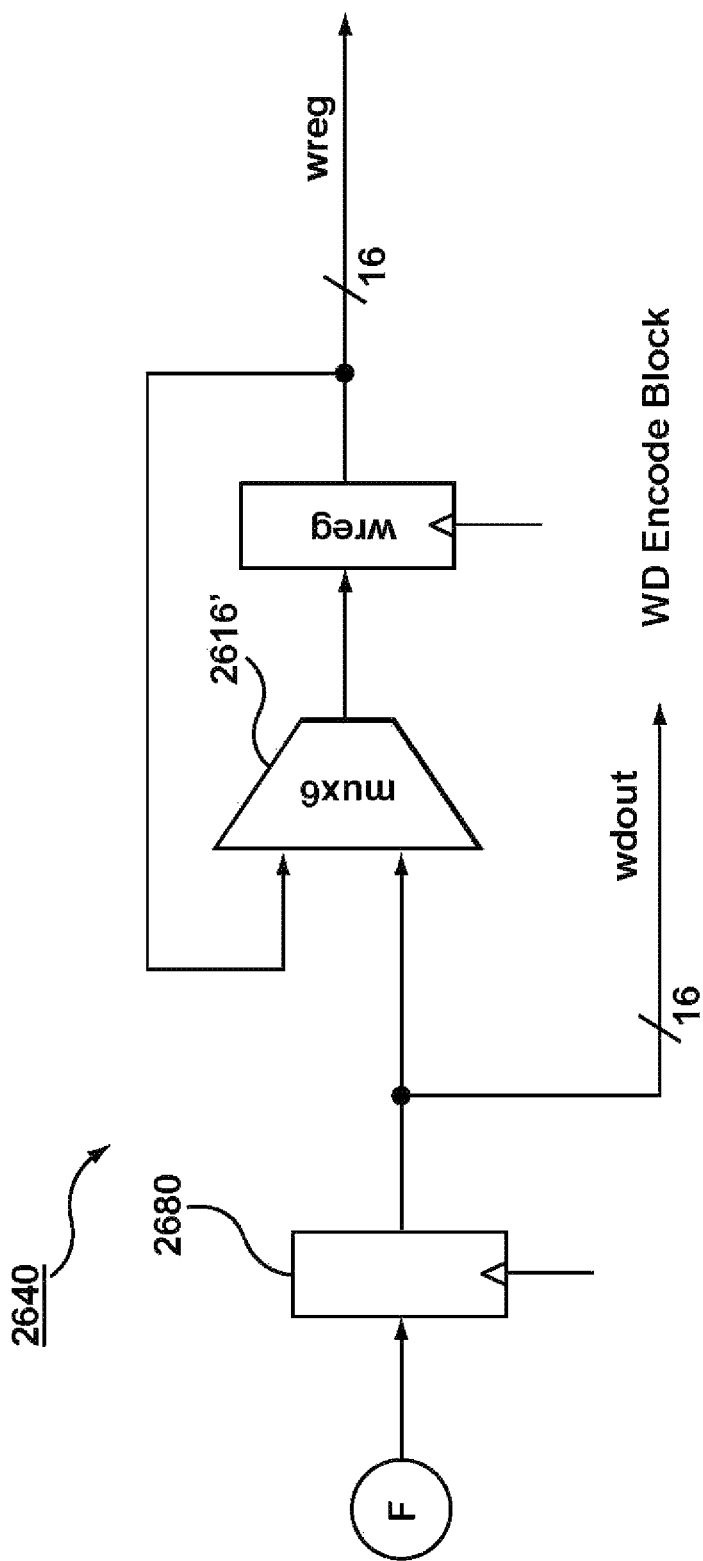

The accumulators 2531-2534 are inputs into the WD Encode and Decode blocks. For example, FIGS. 13F and 13G show an embodiment of a permutation block 2540 implementing a WD encode algorithm.

The WD encode algorithm as shown includes four substitution-permutation rounds. The 64-bit key input to permutation block 2540 is distributed into four 16-bit keys (KEY0, KEY1, KEY2, KEY3). Each round consists of a bitwise XOR with part of the key, a substitution function using S-boxes 2561-2564, and a diffusion operation 2571-2573.

The operation performed by the permutation block 2540 may be represented by the following equations:

| Four Rounds | |
|---|---|
| if rotor2 or rotor3 then | |
|     m ← m ⊕ $K_{Round}$ ⊕ $ACC_{Round}$ | |
| else | [key mixing] |
|     m ← m ⊕ $K_{Round}$ | |
| endif | |
| m ← $S_1(A) \| S_2(B) \| S_3(C) \| S_4(D)$ | [substitution layer] |
| m ← m ⊕ (m << 6) ⊕ (m << 10) | [permutation layer] |

XOR gates 2551-2558 perform a bitwise XOR with a different part of the key in each successive stage. The result is then passed through a substitution layer consisting of S-boxes, or substitution boxes, 2561-2565. The S-box output is then passed to the permutation layer that includes diffusion blocks 2571-2574. Final output of the permutation block 2540 is then stored in permutation block output register 2580.

The WD encode algorithm is provided as an example of any number of pseudorandom permutations that may be implemented in the permutation block 2540. In some embodiments, the pseudorandom permutation may be implemented with block ciphers or any variations thereof. Other embodiments may implement other substitution-permutation networks than the WD encode algorithm.

Reference is next made to FIGS. 14A to 14F, which show an alternative embodiment of a rotor crypto processor datapath 2600 according to another embodiment. FIGS. 14A to 14D generally show an embodiment that is similar to the embodiment of FIG. 6A with a similar operation, and thus, where appropriate a similar numbering scheme is used to refer to similar elements incremented by 2000. For clarity, the main schematic of the datapath 2600 shown in FIG. 13A is shown broken into several sub-modules 2600A, 2600B, and 2600C shown in FIGS. 14B, 14C, and 14D, respectively.

The architecture of the RCP datapath 2600 consists of four rotor state registers labeled RS1 2601, RS2 2602, RS3 2603 and RS4 2604; multiplexers labeled mux1 through mux9 2611-2619; and a permutation block 2640. The rotor crypto processor datapath 600 also include four accumulators acc1 through acc4 2631-2634.

Each round consists of a bitwise XOR with part of the key, a substitution function using a S-boxes 2661, and a diffusion operation 2671. Final output of the permutation block 2640 may be stored in permutation block output register 2680.

Figure 15:
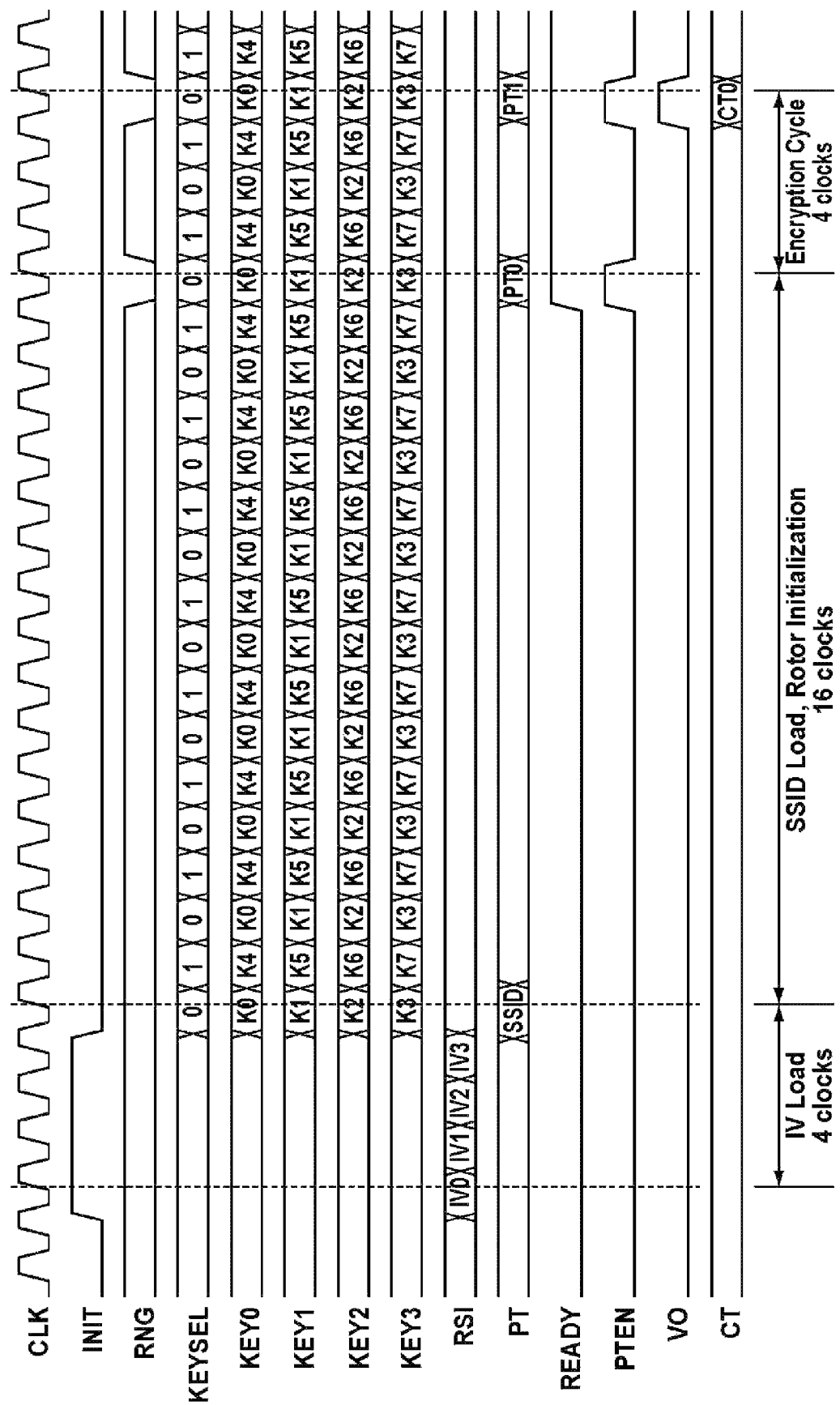
FIG. 15 is a timing diagram of a rotor crypto processor initialization process followed by an encryption cycle of the state machine according to another embodiment.

Reference is now made to FIG. 15, which shows a timing diagram of a rotor crypto processor initialization process followed by an encryption cycle according to another embodiment.

The embodiments herein have been described here by way of example only. Various modification and variations may be made to these exemplary embodiments without departing from the spirit and scope of the invention, which is limited only by the appended claims.

The invention claimed is:

1. A cryptographic processor comprising:
an interface for receiving input data blocks and returning cryptographically processed data blocks;
a memory for storing an encryption state; a pseudorandom permutation block for generating transformed data blocks, the input to the pseudorandom permutation block is at least a portion of the encryption state which is modified for each input data block by at least one of the input data block and previously transformed data block; and
control logic for routing data in the cryptographic processor to return cryptographically processed data blocks at the interface and updating the memory with the next encryption state using transformed data blocks from pseudorandom permutation block;
wherein the cryptographic processor is a rotor cryptographic processor and the memory for storing the encryption state comprises rotor state registers;
wherein the rotor state registers are pipelined and each one of rotor state register is updated in sequential clock cycles; and
wherein the interface returns a data block within 20 clock cycles from receiving an input data block.

2. The cryptographic processor of claim 1 wherein the memory for storing the encryption state further comprises accumulator registers.

3. The cryptographic processor of claim 2 wherein the rotor state registers are pipelined and each one of rotor state register is updated in sequential clock cycles.

4. The cryptographic processor of claim 3 further comprising an intermediate storage register for storing a partially updated portion of the encryption state.

5. The cryptographic processor of claim 2 wherein the memory for storing the encryption state further comprises a deterministic data generator.

6. The cryptographic processor of claim 5 wherein the deterministic data generator is at least one of an LFSR and a counter.

7. The cryptographic processor of claim 1 wherein the memory for storing the encryption state further comprises a deterministic data generator.

8. The cryptographic processor of claim 7 wherein the deterministic data generator is at least one of an LFSR and a counter.

9. The cryptographic processor of claim 1 further comprising an intermediate storage register for storing a partially updated portion of the encryption state.

10. The cryptographic processor of claim 1 wherein the pseudorandom permutation block implements a block cipher.

11. The cryptographic processor of claim 10 wherein the block cipher in the pseudorandom permutation block performs a plurality of substitution-permutation rounds.

12. The cryptographic processor of claim 11 wherein for the pseudorandom permutation block mixes a key with input to at least one of the substitution-permutation rounds.

13. The cryptographic processor of claim 12 wherein the substitution rounds are implemented using substitution boxes.

14. The cryptographic processor of claim 12 wherein the permutation rounds transpose bits from the substitution rounds.

15. The cryptographic processor of claim 12 wherein the permutation rounds XORs the data from the substitution rounds with one or more bit-shifted versions of the data from the substitution rounds.

16. The cryptographic processor of claim 12 wherein the pseudorandom permutation block further comprises an output buffer for storing an output of at least one of the substitution-permutation rounds.

17. The cryptographic processor of claim 1 wherein a portion of the encryption state is substituted for the input data block whereby the interface returns a random number dependent on the encryption state.

18. The cryptographic processor of claim 1 wherein a sum of at least two of the rotor state registers is substituted for the input data block whereby the interface returns a random number dependent on the encryption state.

19. The cryptographic processor of claim 1 having a single adder wherein the pseudorandom permutation block is configured to encode, wherein the interface receives plaintext blocks and returns ciphertext blocks.

20. The cryptographic processor of claim 1 having a single subtracter wherein the pseudorandom permutation block is configured to decode, wherein the interface receives ciphertext blocks and returns plaintext blocks.

21. The cryptographic processor of claim 1 further comprising a second pseudorandom permutation block for performing the inverse transformation, wherein the cryptographic processor is configured to perform encryption and decryption.

22. The cryptographic processor of claim 1 wherein the interface returns a data block within 16 clock cycles from receiving an input data block.

23. The cryptographic processor of claim 1 wherein the interface returns a data block within 4 clock cycles from receiving an input data block.

* * * * *